(12) United States Patent
Tsukagoshi et al.

(10) Patent No.: US 7,110,663 B1
(45) Date of Patent: Sep. 19, 2006

(54) VIDEO PROCESSING APPARATUS AND METHOD FOR ALLOCATING ADDRESSES TO DATA OF MACROBLOCKS AND STORING THE SAME, AND MEDIUM CONTAINING A PROGRAM FOR PERFORMING SUCH METHOD

(75) Inventors: Ikuo Tsukagoshi, Tokyo (JP); Naohiko Kawase, Kanagawa (JP); Kikuo Yamamoto, Chiba (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/719,452

(22) PCT Filed: Apr. 13, 2000

(86) PCT No.: PCT/JP00/02406

§ 371 (c)(1),
(2), (4) Date: Oct. 19, 2000

(87) PCT Pub. No.: WO00/62550

PCT Pub. Date: Oct. 19, 2000

(30) Foreign Application Priority Data

| Apr. 13, 1999 | (JP) | ............................... P11-105255 |
| Apr. 28, 1999 | (JP) | ............................... P11-122647 |
| Jun. 1, 1999  | (JP) | ............................... P11-153797 |

(51) Int. Cl.
*H04N 5/917* (2006.01)
*H04N 7/12* (2006.01)
*H04N 11/02* (2006.01)

(52) U.S. Cl. .................................. 386/112; 375/240.24

(58) Field of Classification Search .................. 386/33, 386/111–112; 375/240, 240.24; 708/203; 709/247; 710/68; 348/384.1, 420.1, 390.1; H04N 5/76, H04N 7/12, 9/79, 7/133
See application file for complete search history.

(56) References Cited

U.S. PATENT DOCUMENTS

| 5,701,386 A |   | 12/1997 | Yoneyama ................... 386/909 |
| 5,767,865 A | * | 6/1998  | Inoue et al. ................. 345/519 |

(Continued)

FOREIGN PATENT DOCUMENTS

JP          406027932 A  *  2/1994

(Continued)

OTHER PUBLICATIONS

Tan, Chee Heng, Liren Zhang, "Effects of cell loss on the quality of service for MPEG video in ATM environment", Proceedings of IEEE Singapore International Conference on Networks, 1995. Theme: Electrotechnology 2000: Communications and Networks. [in conjunction with the] International Conference on Information Engineering., p. 11-15.

*Primary Examiner*—Vincent F. Boccio
(74) *Attorney, Agent, or Firm*—Lerner, David, Littenberg, Krumholz & Mentlik, LLP

(57) ABSTRACT

One macroblock is constructed by 16×16 pixels (bytes). When the macroblocks are stored in a frame memory constructed by a DRAM or the like, addresses are sequentially allocated in an ascending order in a manner such that addresses 0000 to 0255 are allocated to the first macroblock and addresses 0256 to 0512 are allocated to the second macroblock and the macroblocks are stored. The macroblocks stored in this manner are read out in the ascending order of the addresses.

4 Claims, 16 Drawing Sheets

U.S. PATENT DOCUMENTS

| | | | |
|---|---|---|---|
| 6,055,206 A * | 4/2000 | Tanizaki et al. | 365/230.06 |
| 6,212,231 B1 * | 4/2001 | Takano | 375/240.24 |
| 6,424,582 B1 * | 7/2002 | Ooishi et al. | 365/200 |
| 6,466,509 B1 * | 10/2002 | Tanizaki et al. | 365/230.03 |
| 2002/0054518 A1 * | 5/2002 | Ooishi et al. | 365/200 |

FOREIGN PATENT DOCUMENTS

| | | |
|---|---|---|
| JP | 8-163558 | 6/1996 |
| JP | 10-191236 | 7/1998 |

* cited by examiner

Y MACROBLOCK

FRAME MEMORY

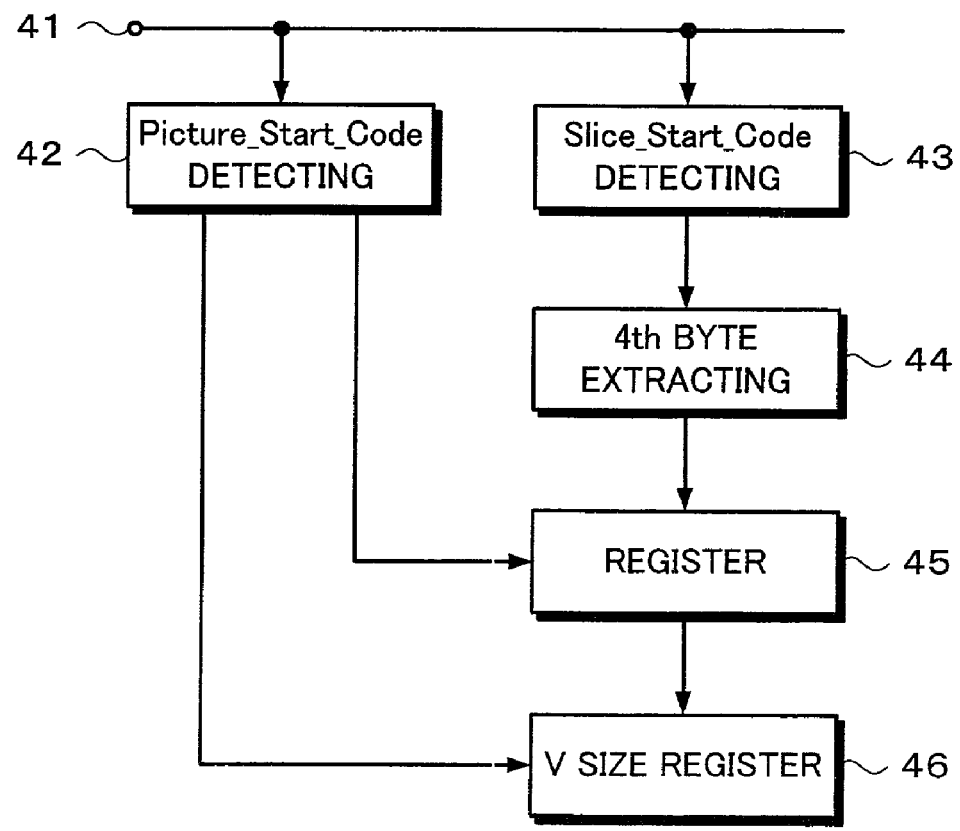

BBB CHAIN 132

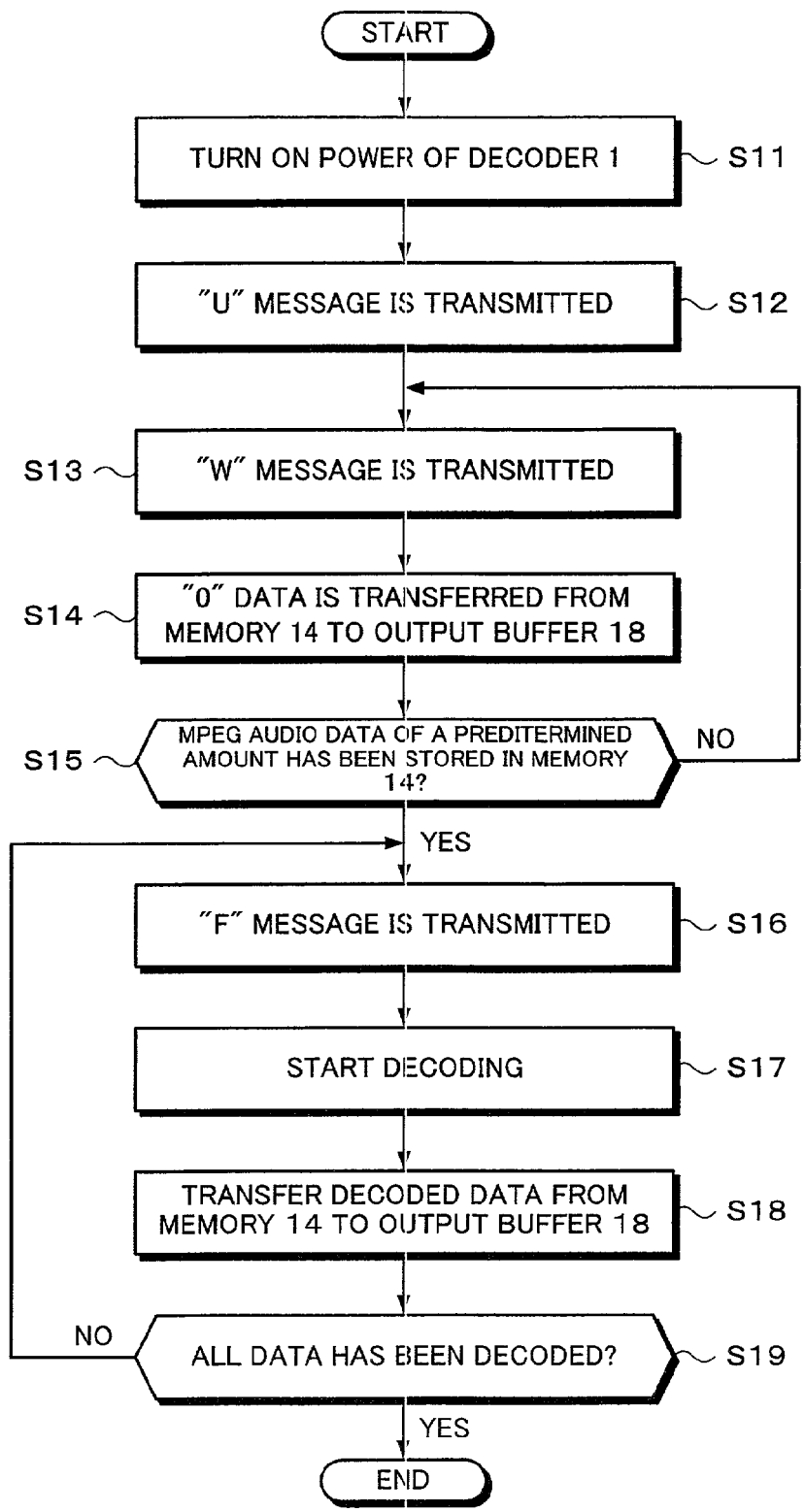

VIDEO PROCESSING APPARATUS AND METHOD FOR ALLOCATING ADDRESSES TO DATA OF MACROBLOCKS AND STORING THE SAME, AND MEDIUM CONTAINING A PROGRAM FOR PERFORMING SUCH METHOD

TECHNICAL FIELD

The invention relates to video processing apparatus and method and a medium and, more particularly, to video processing apparatus and method and a medium which are suitable when they are used to decode a compressed video signal.

BACKGROUND ART

In recent years, a video compressing technique represented by MPEG (Moving Picture Experts Group) 2 has been progressed and used in various fields. In case of decoding video data encoded by MPEG2, the decoding is performed every macroblock. When the video data which was decoded every macroblock is stored in a frame memory, memory addresses of the video data are sequentially allocated in a screen display order. That is, in case of a picture plane such that a Y macroblock constructed by 16×16 pixels as shown in FIG. 1A consists of 720×480 pixels, the macroblocks are stored in the frame memory in a state where 45 macroblocks are arranged in the lateral direction and 30 macroblocks are arranged in the vertical direction as shown in FIG. 1B.

In case of allocating the memory addresses and storing the video data as mentioned above, such an allocation is a suitable address allocation in case of displaying the video data onto a screen on the basis of the video data stored in the frame memories. For example, in the frame memory shown in FIG. 1A, when one line in the top portion of the screen is displayed, since the data in addresses 0000 to 0719 (the data as much as 720 pixels) can be continuously read out, the occurrence of a page mishit can be minimized. The "pagemis" denotes a time which is necessary to precharge a sense amplifier provided in a memory such as a DRAM (Dynamic Random Access Memory) or the like (therefore, a process such as reading of the data or the like cannot be performed while precharging).

A DRAM is generally used as a frame memory. The DRAM is constructed by rows and columns and one row is constructed by charge accumulating devices comprising 256 (there is also a case of 512 or the like)×8 columns. Among the charge accumulating devices, an 8-bit device has external terminals of 8 pins and a 16-bit device has external terminals of 16 pins. It indicates the number of bits which can be outputted by one clock. In case of the 8-bit device, 8 bits are outputted by one clock. In case of the 16-bit device, 16 bits are outputted by one clock. Data can be continuously extracted in the same row. That is, in the 8-bit device, since data of 256×8 bits has been accumulated in one row, data of 256 clocks (data of 256 bytes) can be continuously read out.

In a video decoder or the like, video data which is stored in a frame memory is transmitted on a macroblock unit basis and a decoding order is also set to a macroblock order. In one Y macroblock, one line is constructed by 16 lines each consisting of 16 pixels (therefore, 16 bytes). Therefore, for example, in case of the first Y macroblock, the addresses are divided (instead of serial addresses) in a manner such that addresses 0000 to 0015 are allocated to the first line, addresses 0720 to 0735 are allocated to the second line, and addresses 1440 to 1455 are allocated to the third line, and the data is stored.

In case of decoding a stream of a digital video signal from a stream of the MPEG system, a process for detecting a sequence header (Sequence Header) is first performed in an analyzing unit in a decoding apparatus. This is because unless the Sequence_Header is detected, a picture size and an aspect ratio cannot be specified.

That is, in the MPEG stream, there is a case where a picture plane of the SDTV (Standard Definition Television) or a picture plane of the HDTV (High Definition Television) is transmitted. For example, in a digital satellite broadcasting, there is a case where a program of a picture plane of the SDTV and a program of a picture plane of the HDTV are multiplexed and broadcasted in one channel. There is also a case where a channel of a program of a picture plane of the SDTV and channel of a program of a picture plane of the HDTV are switched.

In case of decoding the MPEG stream, first, it is necessary to set a picture size and an aspect ratio. In the MPEG system, a sequence layer has been determined as a most significant layer. In one sequence, a picture size and a picture rate are identical. A Sequence_Header is transmitted at the head of each sequence. The picture size, aspect ratio, picture rate, and the like have been described in the Sequence_Header.

Therefore, hitherto, in case of decoding a bit stream of the MPEG system, first, in order to set the picture size and aspect ratio, the Sequence_Header is detected. After the picture size and aspect ratio were set from the Sequence_ Header, a decoding is started from the first picture which was intrafield encoded or intraframe encoded.

After the data stored in one row was extracted, the process advances to the next row and an apparatus has to wait for a time of about 6 clocks for precharging until the data stored in the next row is read out. In this way, the precharge necessary to read out the data stored in another row is called "pagemis" as mentioned above. In the foregoing 8-bit device, the pagemis occurs every 256 clocks (each time the data of 256 bytes is extracted). In the foregoing 16-bit device, the pagemis occurs every 128 clocks. It will be understood that, as mentioned above, when an amount of data which can be extracted by one clock increases, the number of times of occurrence (generating period) of the pagemis decreases.

As shown in FIG. 1B, in the case where the video data is stored and the data is sequentially read out one line by one and displayed in a manner such that the data in addresses 0000 to 0719 is read out to thereby display the first horizontal line and the data in addresses 0720 to 1439 is subsequently read out to thereby display the second horizontal line, a pagemis occurs every 256 bytes in the 8-bit device. Since the pagemis causes a loss time, the ability of a memory (DRAM) can be made the most of by setting in such a manner that the pagemis does not occur as possible.

In case of the foregoing video recorder, the video data is stored on a macroblock unit basis and read out on a macroblock unit basis. Since one Y macroblock is constructed by 16 lines as mentioned above, the pagemis occurs each time one line is read out. That is, the pagemis occurs 16 times whenever one Y macroblock is read out. In case of a chroma signal (Cb, Cr), since one macroblock is constructed by 8 lines each consisting of 8 bytes, the pagemis occurs 8 times whenever one Cb (Cr) macroblock is read out.

In case of using the 16-bit device for the frame memory, since the data of 16 bits (2 bytes) can be outputted in response to one clock, the pagemis occurs at a rate of once per 8 clocks in the Y macroblock. In each of the Cb macroblock and the Cr macroblock, the pagemis occurs at a rate of once per 4 clocks. Therefore, 8 clocks (one line of the Y macroblock is constructed by 16 bytes) are necessary to read out one line of the Y macroblock and 8×16 clocks (one Y macroblock is constructed by 16 lines) are necessary to read out one Y macroblock.

On the other hand, assuming that a time of 6 clocks is expended for the pagemis of one time, it will be understood that the loss time that is caused by the pagemis is equal to the time of 6×16 clocks because the pagemis occurs 16 times in case of reading out one Y macroblock. This means that the ratio of the pagemis is fairly larger than the time (8×16 clocks) which is necessary to read out one Y macroblock. In other words, it means that the loss time is large. Also in case of the macroblock of chroma, the ratio of the loss time for the time that is necessary to read out the data is similarly large.

The pagemis also occurs in case of performing the decoding based on the motion compensation. That is, although the video data as much as one macroblock is extracted from an arbitrary position in the frame memory by a motion vector associated for the macroblock to be decoded, since the address is moved by an amount of one line each time one line of the macroblock is read out in a manner similar to the case mentioned above, the pagemis occurs. There is a problem such that if the user wants to make the most of the ability of the DRAM or the like, it is necessary to suppress the loss time such as a pagemis as small as possible.

The invention is made in consideration of such a circumstance and it is an object of the invention to suppress the occurrence of the pagemis by allocating addresses to video data of macroblocks in the ascending order and storing the data.

In case of decoding the MPEG stream, first, the Sequence_ Header is detected and the picture size and aspect ratio are set. However, if the MPEG stream is decoded after the Sequence_Header was detected, there is a problem such that it takes time to detect the Sequence_Header and a fairly long waiting time is necessary until the reproduction is started.

That is, the sequence layer of the MPEG system is a stream in which the picture size and picture rate are identical. Although the Sequence Header can be provided at a minimum GOP (Grop Of Picture) period, a period of the Sequence_Header is not determined. Therefore, a maximum length of sequence is equivalent to one video program. Thus, hitherto, for example, when a channel of a satellite broadcasting is switched, there is a case where it takes time to detect the Sequence_Header and a fairly long waiting time is necessary until the reproduction is started.

Another object of the invention is to provide video processing apparatus and method in which when Sequence_ Header information of an MPEG stream is not detected, information of the Sequence_Header is predicted and a decoding is started, thereby enabling the MPEG stream to be immediately decoded.

DISCLOSURE OF INVENTION

According to the invention, there is provided a video processing apparatus comprising: input means is for inputting video data of a macroblock unit; storage means for allocating addresses to the video data inputted by the input means in an ascending order and storing the video data; and reading means for reading out the video data stored in the storage means in the ascending order of the addresses.

According to the invention, there is provided a video processing method comprising: an inputting step of inputting video data of a macroblock unit; a storing step of allocating addresses to the video data inputted by the inputting step in an ascending order and storing the video data; and a reading step of reading out the video data stored by the storing step in the ascending order of the addresses.

According to the invention, there is provided a program of a medium, comprising: an inputting step of inputting video data of a macroblock unit; a storing step of allocating addresses to the video data inputted by the inputting step in an ascending order and storing the video data; and a reading step of reading out the video data stored by the storing step in the ascending order of the addresses.

In the video processing apparatus, video processing method, and medium according to the invention, the addresses are allocated to the inputted video data of the macroblock unit in the ascending order, the data is stored, and the stored video data is read out in the ascending order of the addresses.

According to the invention, there is provided a video processing apparatus for decoding a video stream having a layer structure constructed by a sequence layer, a GOP layer, a picture layer, a slice layer, a macroblock layer, and a block layer, comprising: Sequence_Header information predicting means for predicting Sequence_Header information on the basis of information which certainly appears in a picture; and decoding means for decoding video data by using the information predicted by the Header information predicting means when the Sequence_Header is not detected.

The fourth byte of a Slice_Start_Code indicates a vertical position of a slice. Therefore, the number of pixels in the vertical direction of a screen is obtained by detecting the fourth byte of the Slice_Start_Code. A (Macroblock_Address_Increment) indicates skip information of the macroblock. Therefore, the number of macroblocks in the horizontal direction of the screen is obtained by accumulating the macroblock address increment each time the macroblock is decoded. By multiplying it by a size of macroblock, the number of pixels in the horizontal direction of the screen is obtained.

If the MPEG stream is decoded by using the information predicted as mentioned above, the MPEG stream can be immediately deccded without detecting the Sequence_ Header.

BRIEF DESCRIPTION OF DRAWINGS

FIG. 9 is a schematic diagram for use in explanation of slices;

FIG. 10 is a functional block diagram showing a construction of a predicting circuit of a picture size in the horizontal direction;

FIG. 16 is a flowchart for explaining the processing operation of the decoder 100.

BEST MODE FOR CARRYING OUT THE INVENTION

Figure 2:
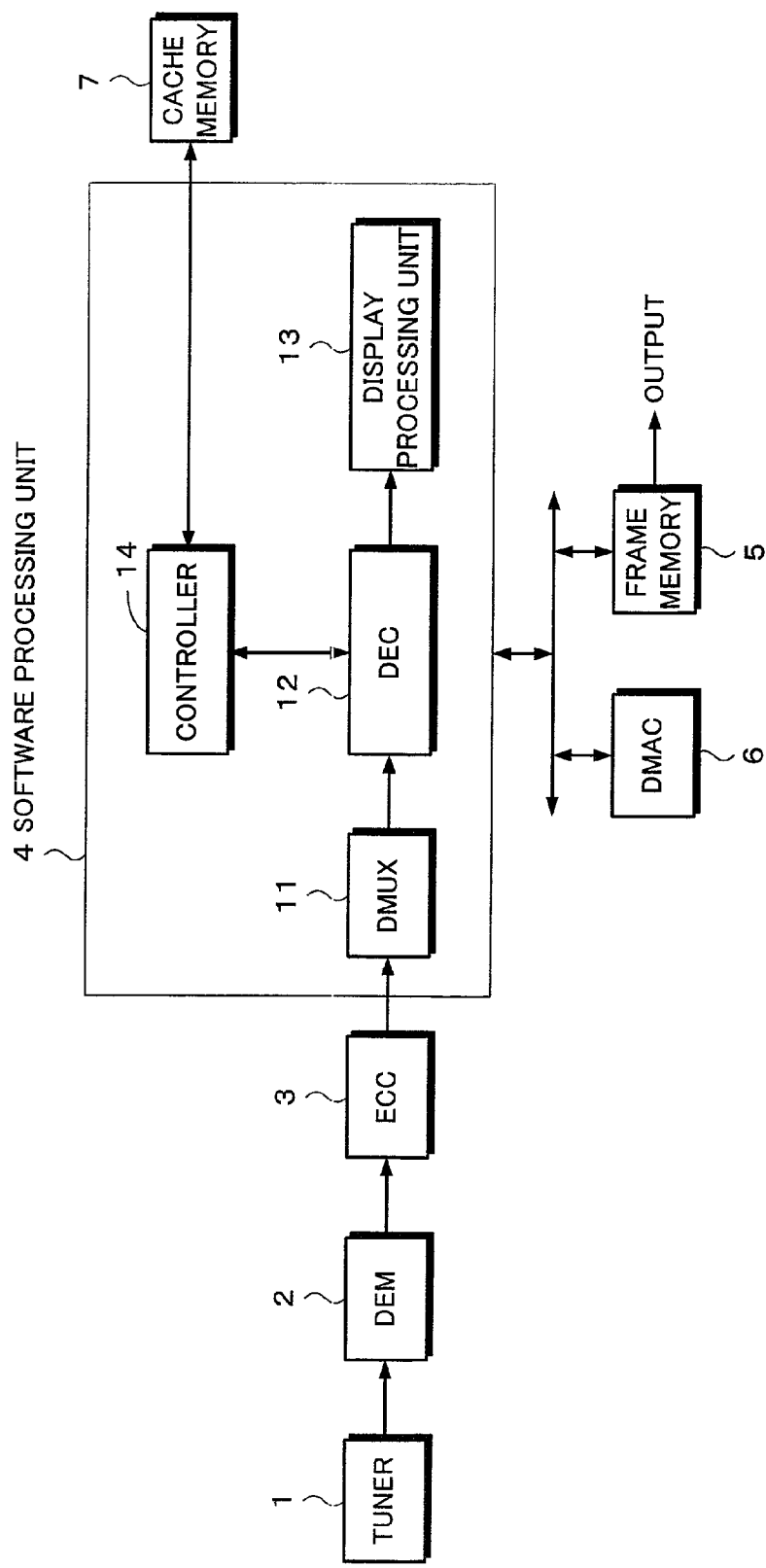
FIG. 2 is a block diagram showing a construction of an embodiment of a video processing apparatus to which the invention is applied.

FIG. 2 is a block diagram showing a construction of a video processing apparatus for decoding data encoded by the MPEG2 system. Video data received by a tuner 1 is demodulation processed by a demodulation processing unit 2 and error correction processed by an error correction processing unit 3. Further, the error correction processed video data is sent to a software processing unit 4. The software processing unit 4 is constructed by a software program which is executed by a CPU (Central Processing Unit) (not shown). A demultiplexer unit 11 in the software processing unit 4 demultiplexes the inputted data into the video data and audio data every channel. The demultiplexed video data is decoded by a decoding unit 12 on the basis of the MPEG system.

In a display processing unit 13, an output of the decoding unit 12 is scanning line number converted, for example, from a high definition television signal represented by the HDTV to a television signal of the NTSC (National Television System Committee) system. A controller 14 controls each unit of the software processing unit 4 besides the decoding unit 12 and uses a cache memory 7 at an arbitrary time with respect to processes of the video data. A DMAC (Direct Memory Access Controller) 6 controls a DMA transfer from the cache memory 7 to a frame memory 5. The frame memory 5 is constructed by, for example, a DRAM and the stored video data is outputted to a video display apparatus (not shown).

Figure 3:
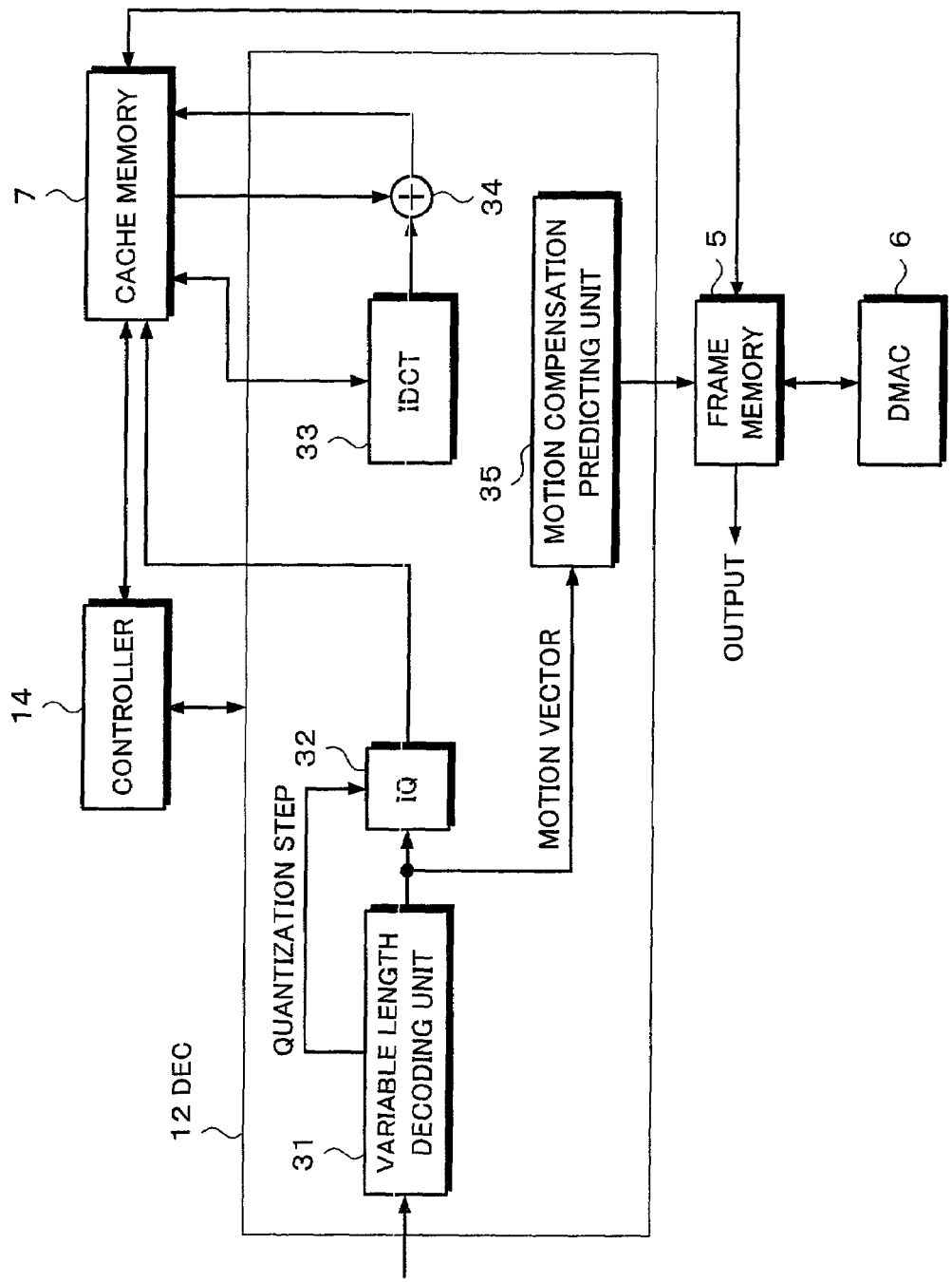
FIG. 3 is a block diagram showing a detailed construction of a decoding unit 12 in FIG. 2.

FIG. 3 is a block diagram showing a more detailed construction of the decoding unit 12 shown in FIG. 2. The video data outputted from the demultiplexer unit 11 is inputted to a variable length decoding unit 31 in the decoding unit 12. The variable length decoding unit 31 performs a variable length decoding process to the inputted video data, outputs a quantization step and the video data to an inverse quantizing unit 32, and outputs a motion vector to a motion compensation predicting unit 35, respectively. On the basis of the quantization step supplied from the variable length encoding unit 31, the inverse quantizing unit 32 inversely quantizes the video data which was variable length encoding processed. The inversely quantized video data is stored in the cache memory 7 through the controller 14.

In case of an intra-macroblock, the video data which was inverse DCT transformation processed by an inverse DCT transforming unit 33 is transferred and stored as it is to the cache memory 7. In case of a nonintra-macroblock, the motion compensation predicting unit 35 arithmetically operates a predictive macroblock by using the motion vector supplied from the variable length decoding unit 31 and a reference video image stored in the frame memory 5 and the video data is stored in the cache memory 7. An arithmetic operating unit 34 adds the video data (differential data) supplied from the inverse DCT transforming unit 33 and the predictive macroblock supplied from the cache memory 7 to thereby obtain decoded video data and transfers it to the cache memory 7. The video data stored in the cache memory 7 is DMA transferred to the frame memory 5 on the basis of a control of the DMAC 6.

The operation of the video decoding apparatus shown in FIG. 2 will now be described. The tuner 1 receives the video data and outputs it to the demodulation processing unit 2. The demodulation processing unit 2 which received the video data demodulation processes the inputted video data and outputs it to the error correction processing unit 3. The error correction processing unit 3 performs an error correcting process of the video data which was inputted and demodulation processed and outputs it to the software processing unit 4. In the software processing unit 4, the inputted video data is demultiplexed to the video data and audio data every channel by the demultiplexer unit 11 and they are outputted to the decoding unit 12.

The decoding unit 12 is controlled by the controller 14, decodes the video data by arbitrarily using the cache memory 7 and frame memory 5, and outputs the decoded video data to the display processing unit 13. The display processing unit 13 performs a scanning line number converting process to the decoded video data and stores it into the frame memory 5. The video data stored in the frame memory 5, namely, the video data subjected to the scanning line number converting process is outputted to a video display apparatus (not shown) or the like.

Figure 4:
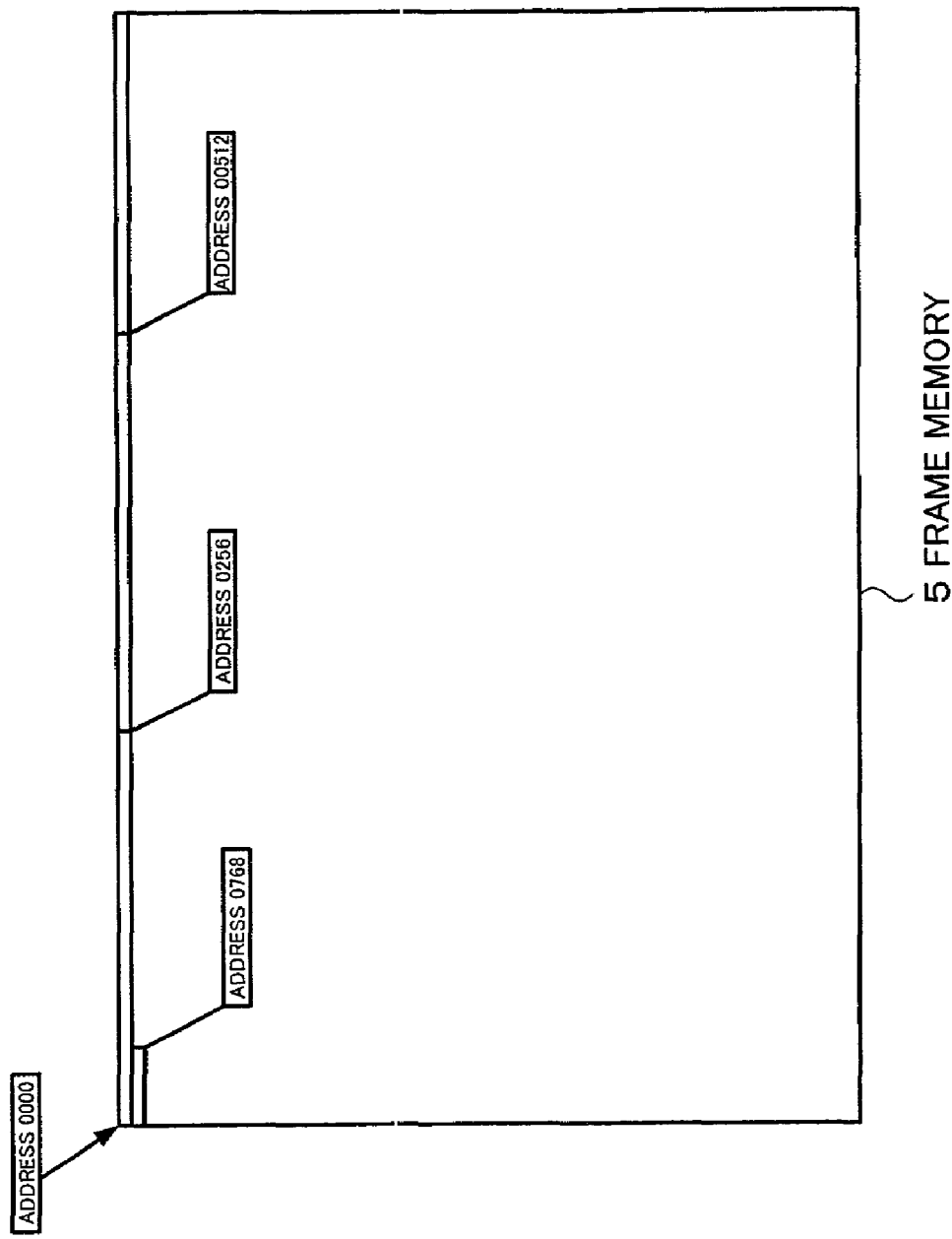
FIG. 4 is a diagram for explaining a method of storing video data according to the invention.

The writing of the video data into the frame memory 5 in the decoding unit 12 shown in FIG. 3 will be described. The writing of the data into the frame memory 5 and the reading of the data from the frame memory 5 are performed on a macroblock unit basis. Since one Y macroblock is constructed by 16×16 pixels, it is constructed by the data of 256 bytes. Each of the Cb macroblock and the Cr macroblock is constructed by 64 (=8×8) bytes. Therefore, as shown in FIG. 4, as for the Y macroblocks, continuous addresses are sequentially allocated in the ascending order and those macroblocks are stored in a manner such that the Y macroblock which is read for the first time and located on the left top side on the screen is stored in addresses 0000 to 0255 in the frame memory 5, the Y macroblock which is subsequently read is stored in addresses 0256 to 0511, and further, the Y macroblock which is subsequently read is stored in addresses 0512 to 0768.

Figure 5:
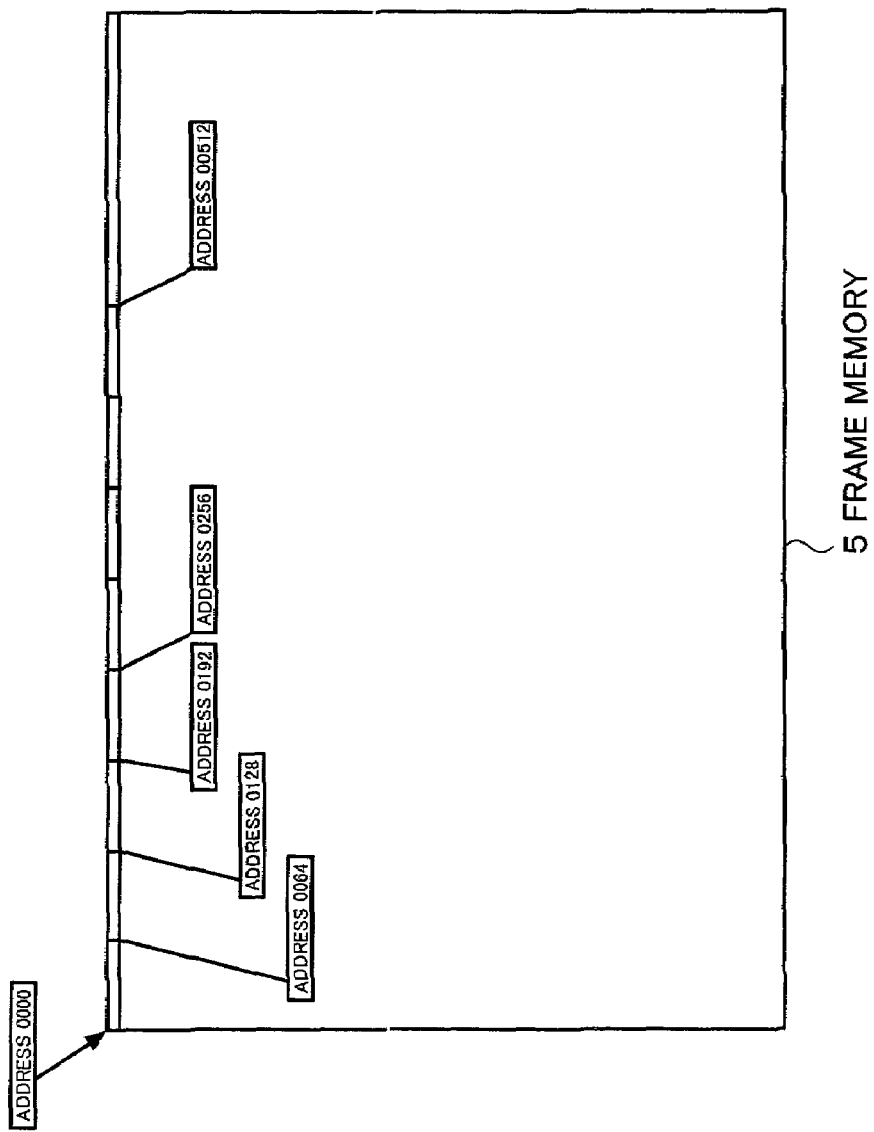
FIG. 5 is a diagram for explaining a method of storing the video data according to the invention.

Similarly, as shown in FIG. 5, as for the chroma macroblocks of the Cb macroblocks and the Cr macroblocks, continuous addresses are sequentially allocated in the ascending order and those macroblocks are stored in a manner such that the chroma macroblock which is read for the first time is stored in addresses 0000 to 0063 and the chroma macroblock which is subsequently read is stored in addresses 0064 to 0128.

By storing the video data of the macroblock unit as mentioned above, the pagemis never occurs in both of the Y macroblock and the Cb (Cr) macroblock at the time of reading out one macroblock. That is, the pagemis occurs when the row as a target to be read out is switched, and one row is constructed by 256 bytes (hereinafter, properly, 256 bytes are called one page and a delimiter of each unit is called a page delimiter). Therefore, the pagemis occurs at least every reading operation of 256 bytes. However, if the data is stored in the frame memory 5 as mentioned above, the page delimiter is generated every macroblock with respect to the Y macroblock. The page delimiter is generated every 4 macroblocks with respect to the Cb (Cr) macroblock.

Since it is sufficient to reduce the number of times of switching of the row in order to minimize the pagemis (loss time), the loss time can be reduced by storing the data into the frame memory 5 as mentioned above.

Explanation will now be made with respect to the case of extracting the predictive video data by the motion compensation vector from the frame memory 5 in which the video data has been stored. The case where the Y macroblock is set to a target will be described as an example. As mentioned above, one Y macroblock is constructed by 16×16 pixels× 16×16 bytes).

Figure 6:
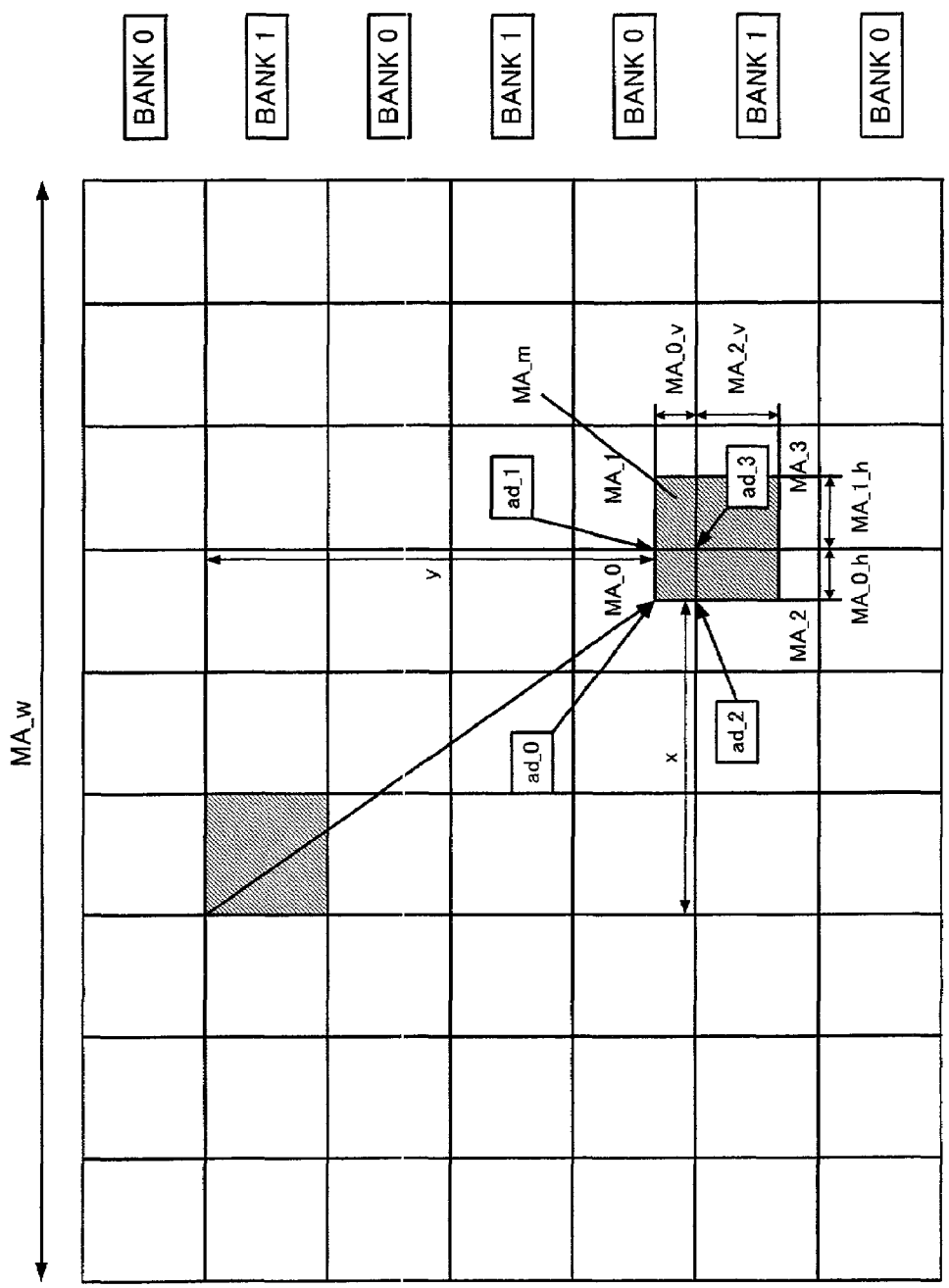
FIG. 6 is a diagram for explaining a reading of a predictive macroblock.

FIG. 6 is a diagram showing a positional relation of a macroblock MA_n (macroblock which is decoded) to be predicted from a macroblock MA_m by predicting a picture plane which is displayed on a screen of the screen display apparatus. Among motion compensation vectors of MA_n, the motion compensation vector in the lateral (horizontal) direction in the diagram is expressed by a vector x and the motion compensation vector in the longitudinal (vertical) direction in the diagram is expressed by a vector y. The vectors x and y are used for deciding address offsets in the horizontal and vertical directions by which the data should be extracted from the upper left edge portion of the macroblock MA_m.

A case where the macroblock MA_m whose position is unconditionally determined by the vectors x and y overlaps with up to four macroblocks as shown in FIG. 6 is predicted. If those four macroblocks are described by a macroblock MA_0, a macroblock MA_1, a macroblock MA_2, and a macroblock MA_3 in order from the upper left to the lower right, relations between the macroblock MA_n to be decoded and the vectors x and y are as shown by the following equations.

$$MA\_0 = MA\_n + x/16 + MA\_w \times y/16$$

$$MA\_1 = MA\_0 + 1$$

$$MA\_2 = MA\_0 + MA\_w$$

$$MA\_3 = MA\_0 + MA\_w + 1 \quad (1)$$

where, x and y denote magnitudes of the vectors x and y and MA_w indicates the number of macroblocks arranged on a line in the horizontal direction of the screen.

Further, the addresses (head addresses) at the upper left edges in the portions of the macroblocks MA_0, MA_1, MA_2, and MA_3 which overlap with the macroblock MA_m are calculated by the following equations. The head addresses of the macroblocks MA_0, MA_1, MA_2, and MA_3 are assumed to be addresses ad_0, ad_1, ad_2, and ad_3, respectively.

$$ad\_0 = ad\_MA\_0 + x\%16 + 16x(y\%16)$$

$$ad\_1 = ad\_MA\_1 + 16x(y\%16)$$

$$ad\_2 = ad\_MA\_2 + x\%16$$

$$ad\_3 = ad\_MA\_3 \quad (2)$$

where, ad_NMA_0, ad_MA_1, ad_NMA_2, and ad_MA_3 denote head addresses of the macroblocks MA_0, MA_1, MA_2, and MA_3, x%16 denotes a remainder obtained when the magnitude of the vector x is divided by 16, and similarly, y%16 denotes a remainder obtained when the magnitude of the vector y is divided by 16.

The number of horizontal data and the number of vertical lines in the portions of the macroblocks MA 0, MA_1, MA_2, and MA_3 which overlap with the macroblock MA_m are calculated by the following equations. In the following equations, MA_0_h denotes the number of horizontal data in the overlapped portion of the macroblock MA_m and the macroblock MA_0 and MA_0 v denotes the number of vertical lines in the overlapped portion of the macroblock MA_m and the macroblock MA_0. The other descriptions also indicate similar meanings.

| | |
|---|---|
| MA_0_h = 16 − (x%16), | MA_0_v = 16 − (y%16) |
| MA_1_h = 16 − MA_0_h, | MA_1_v = MA_0_v |
| MA_2_h = MA_0_h, | MA_2_v = 16 − MA_0_v |
| MA_3_h = MA_1_h, | MA_3_v = MA_2_v |
| | . . . (3) |

As mentioned above, in case of extracting the data from the four macroblocks MA_0, MA_1, MA_2, and MA 3, the pagemis occurs four tires. In case of extracting the data from the same macroblock (one macroblock), no pagemis occurs. That is, there is a possibility such that the pagemis occurs at least 0 time and at most four times.

However, two banks are provided in the DRAM or the like and the writing or reading of the data is performed by switching the banks. In the macroblock, the data is alternately written in the different banks every horizontal line. Therefore, in case of performing the writing by using two banks 0 and 1 as shown in FIG. 6, the following processes are repeated: namely, the data of one horizontal line of the macroblock MA_0 is read out from the bank 0; the data of one horizontal line of the macroblock MA_2 is read out from the bank 1; the data of one horizontal line of the macroblock MA_1 is read out from the bank 0; and subsequently, the data of one horizontal line of the macroblock MA_3 is read out from the bank 1.

If the data is read out by switching the banks 0 and 1 as mentioned above, the pagemis does not occur. That is, since each of the banks 0 and 1 has an independent sense amplifier, it can be independently set to an active state (precharging state). Therefore, even if the macroblocks stored in the other bank are continuously read out (even if the data is read out by switching the banks), the pagemis (loss time) due to the switching can be ignored. Thus, only the pagemis which occurs when the data of the macroblock MA_0 is first read out becomes the loss time.

Although the case of reading out the Y macroblock has been described above in the equations (1) to (3), in case of the chroma (Cb, Cr) macroblocks, it is sufficient to calculate by replacing 16 with 8 in each equation.

By writing and reading the video data as mentioned above, a time which is required for data transfer in the time necessary for reading out one Y macroblock is equal to 8×16 clocks. Assuming that the time of one pagemis is equal to 6 clocks, the loss time due to the pagemis is equal to 6×1 clocks, so that the ratio of the loss time due to the pagemis to the time for data transfer can be reduced. Similarly, even in case of reading out one Cb (Cr) macroblock, the ratio of the loss time due to the pagemis to the time for data transfer can be reduced.

Figure 1A:
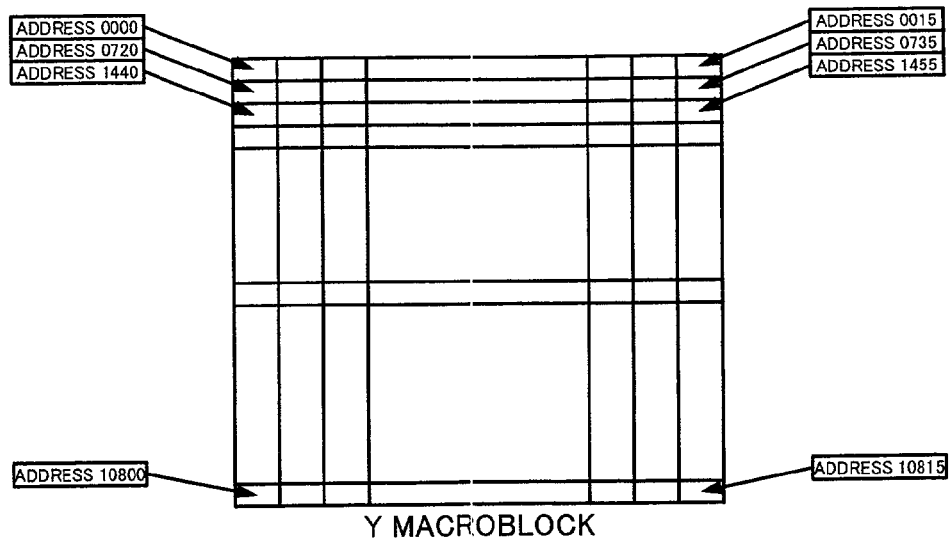
FIGS. 1A and 1B are diagrams for explaining a conventional method of storing video data.
Figure 1B:
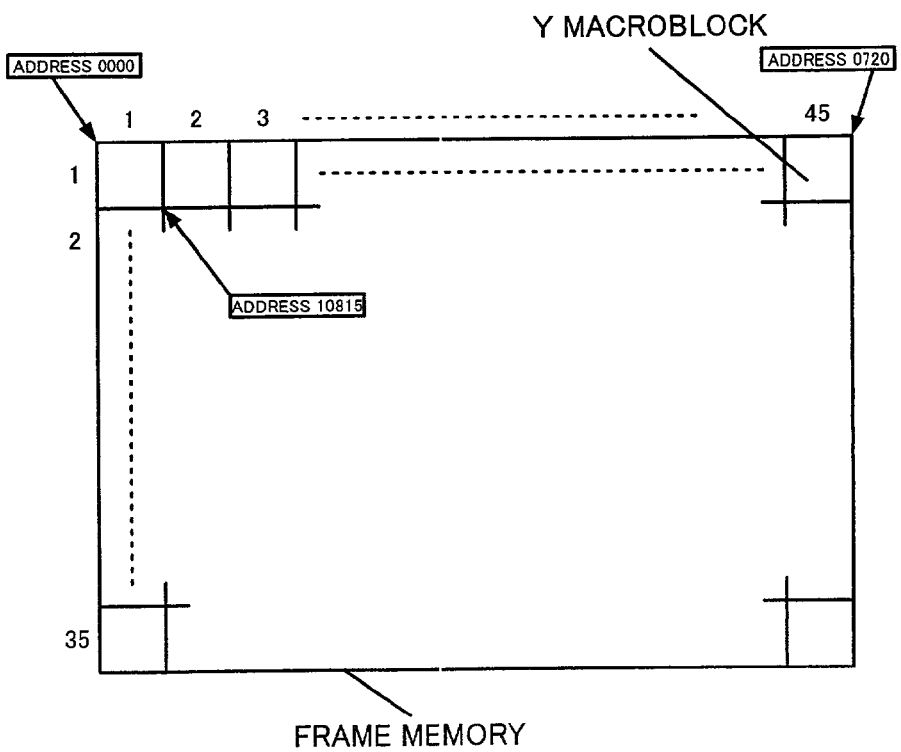

Processes in case of outputting the video data to the video display apparatus (not shown) will now be described. In the case where the video data of the macroblock unit was stored in a manner such that a data arrangement on the screen and a data arrangement in the frame memory are the same as shown in FIG. 1B, the video display is performec by reading out the data in the ascending order of the addresses. However, in case of storing the macroblocks by one or two lines as shown in FIG. 4 (FIG. 5), a video image cannot be displayed by reading out the data in the ascending order of the addresses.

In other words, in the case where the video data was stored as shown in FIG. 1B, the video data of 16 pixels (16 bytes) is read out from each macroblock in order to display one line on the screen. Even in the case where the video data was stored as shown in FIG. 4 (FIG. 5), the video data of every 16 bytes has to be similarly read out from each macroblock. By this method, the row has to be switched each time 16 bytes are read out and the pagemis occurs each time. To eliminate such an inconvenience, it is sufficient to perform an address conversion and output the video data to the video display apparatus as shown below.

The cache memory 7 shown in FIG. 3 is used as a temporary buffer and the video data of one slice is loaded into the cache memory 7 from the frame memory 5 and converted into a memory structure (address) as shown in FIG. 1B. In case of using an SRAM (Static RAM) as a cache memory 7, since no page exists like a DRAM, no pagemis occurs.

A case of converting the addresses from the state where the Y macroblocks have been stored as shown in FIG. 4 to a state where the Y macroblocks have been stored as shown in FIG. 1B will be specifically described. The video data in addresses 0000 to 0015 is read out as video data of the first line from the frame memory 7 in which the video data has been stored as shown in FIG. 4 and is stored in addresses 0000 to 0015 in the cache memory 7. Then, the video data in addresses 0016 to 0031 is read out as video data of the second line and stored in addresses 0720 to 0735 in the cache memory 7. Subsequently, the video data in addresses 0032 to 0047 is read out as video data of the third line and stored in addresses 1440 to 1455 in the cache memory 7. Such processes are repeated.

In case of reading out the video data from the frame memory 7 as mentioned above, since the reading operation itself is executed in the ascending order of the addresses, the pagemis occurs only every 256 bytes. The video data stored in the cache memory 7 is transferred again to the frame memory 5 and stored. The video data stored in the frame memory 5 as shown in FIG. 1B is outputted to the video display apparatus (not shown).

Since the re-transfer from the cache memory 7 to the frame memory 5 is performed in the address order of the one-to-one corresponding relationship, if the cache memory 7 is constructed by the SRAM, no pagemis occurs, so that the loss time clue to the above processes does not occur.

Although the video data is transferred again from the cache memory 7 to the frame memory 5 in the above description, it can be also transferred from the cache memory 7 to a frame memory (DRAM) for displaying or scaling which is different from the frame memory 5.

By writing and reading the video data of the macroblocks as mentioned above, the macroblocks obtained after completion of the decoding can be sequentially stored in the same page in the frame memory comprising the DRAM or the like. Therefore, the number of times of occurrence of the pagemis can be reduced by using a burst transfer function of the DRAM and a memory band width can be improved. Since the macroblocks have been stored in the same page in the frame memory, even in case of extracting a reference macroblock by the motion compensation vector, the number of times of occurrence of the pagemis can be reduced by using a burst transfer of the DRAM and a memory band width can be improved.

When the macroblocks are stored in the frame memory, by alternately storing them into the other bank in the DRAM every horizontal width of the screen, even in case of extracting the predictive data from a plurality of (up to four) macroblocks, the pagemis can be minimized. Further, since the memory can be constructed by two banks, a structure of the memory system can be simplified and also realized by a DRAM of a small (less) capacity, so that flexibility is high.

Figure 7:
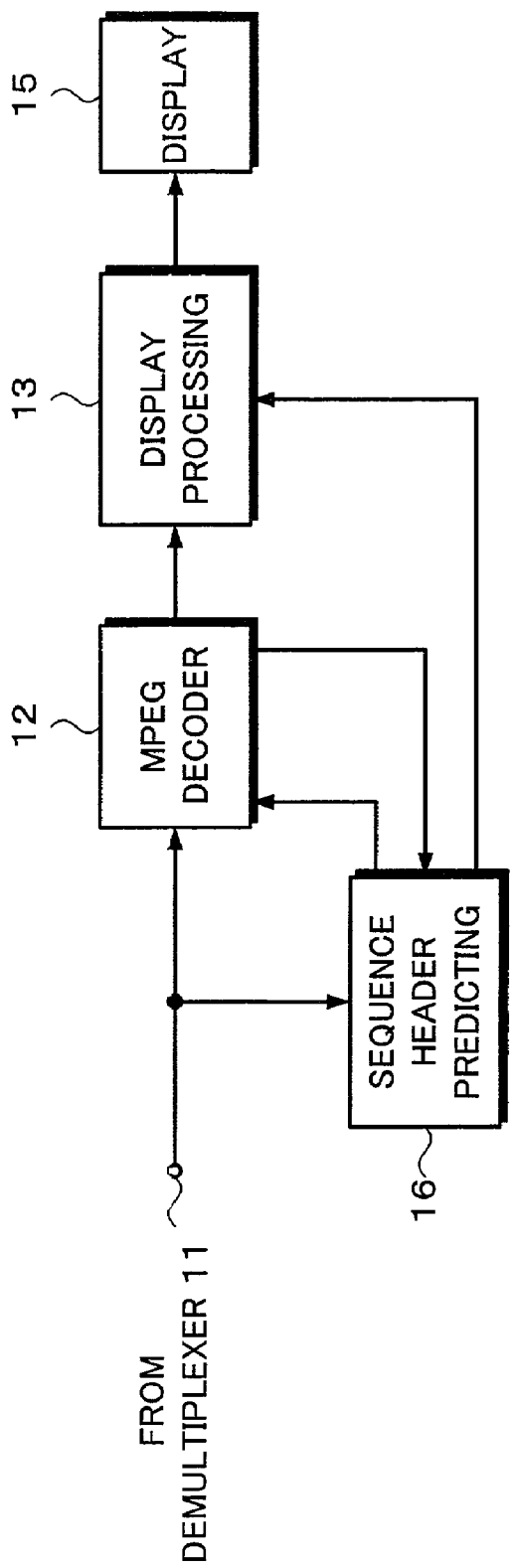
FIG. 7 is a block diagram of an example of an MPEG decoding apparatus to which the invention is applied.

A video processing apparatus in which when the Sequence_Header information of the MPEG stream is not detected, the information of Sequence_Header is predicted and the decoding is started, thereby enabling the MPEG stream to be immediately decoded will now be described. FIG. 7 shows an example of the video processing apparatus to which the invention is applied. In FIG. 7, the MPEG stream from the demultiplexer 11 is supplied to the MPEG decoder 12 and supplied to a Sequence_Header predicting circuit 16. The MPEG decoder 12 executes a decoding process of the MPEG stream.

The MPEG stream is decoded by the MPEG decoder 12 and a stream of the digital video data is outputted from the MPEG decoder 12. An output of the MPEG decoder 12 is supplied to a display 15 through the display processing unit 13. Thus, a picture plane based on the MPEG stream is displayed on the display 15.

In the case where the MPEG stream is decoded by the MPEG decoder 12, first, it is necessary to set a picture size, an aspect ratio, or the like. Those information can be detected by the Sequence_Header. However, there is a case where it takes time to detect the Sequence_Header.

Therefore, the Sequence_Header predicting circuit 16 is provided. The Sequence_Header predicting circuit 16 predicts the information to be transmitted by the Sequence_Header by using the information which is certainly included in each picture.

That is, in the Sequence_Header, the information such as picture size, aspect ratio, frame rate, VBV buffer size, quantization matrix, and the like is sent. The Sequence_Header predicting circuit 16 predicts the picture size in the vertical direction by using the information of slices. The picture size in the horizontal direction is predicted by using the information of the macroblock. The aspect ratio is predicted by using the picture size in the vertical direction and the picture size in the horizontal direction which were predicted. By detecting a decoding timing by a time stamp of DTS/PTS or the like, the frame rate is predicted. An output of the Sequence Header predicting circuit 16 is supplied to the MPEG decoder 12 and supplied to the display processing unit 13.

In case of decoding the MPEG stream by the MPEG decoder 12, if the Sequence_Header can be detected, the picture size, aspect ratio, frame rate, VBV buffer size, quantization matrix, progressive sequence, and the like are set by using the information of the Sequence_Header.

When the Sequence_Header cannot be detected by the MPEG decoder 12, the picture size, aspect ratio, frame rate, VBV buffer size, quantization matrix, progressive sequence, and the like which were predicted by the Sequence_Header predicting circuit 16 are set.

When the Sequence_Header cannot be detected by the MPEG decoder 12, the picture size and aspect ratio which were predicted by the Sequence_Header predicting circuit 16 are transmitted to the display processing circuit 13. A display screen is set in accordance with the picture size and aspect ratio which were predicted by the Sequence_Header predicting circuit 16.

In the MPEG decoding apparatus to which the invention is applied as mentioned above, the Sequence Header predicting circuit 16 for predicting the information of the Sequence_Header is provided. When the Sequence_Header cannot be detected, a decoding process is performed by using the picture size and aspect ratio predicted by the Sequence_Header predicting circuit 16. Therefore, for example, even when the channels are switched in the satellite broadcasting, there is hardly a waiting time and the reproduction can be started.

A principle and a construction of the Sequence_Header predicting circuit 16 will now be specifically explained.

Figure 8:
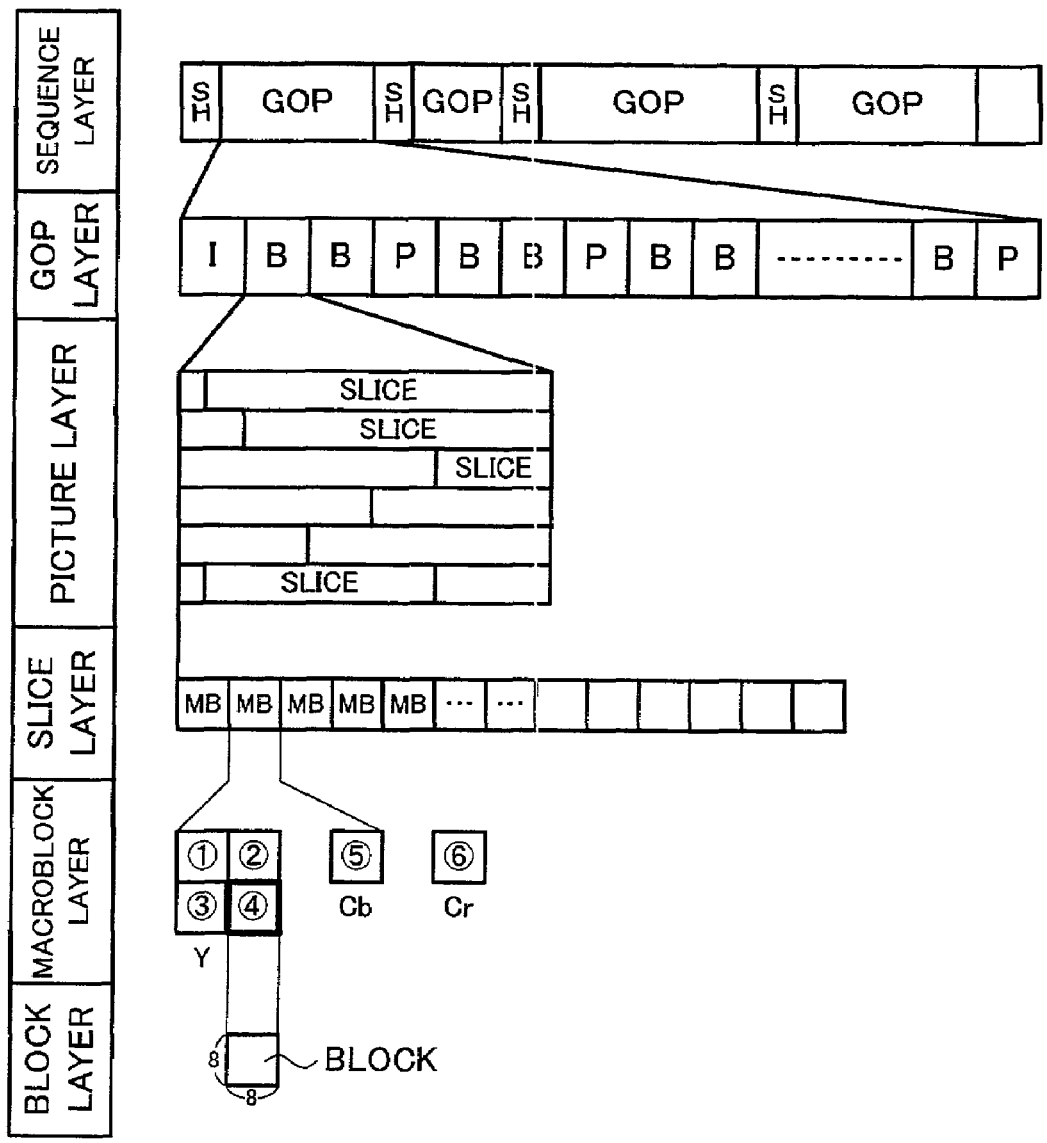
FIG. 8 is a schematic diagram for use in explanation of a layer structure of the MPEG system.

As shown in FIG. 8, a data structure of the MPEG is a layer structure of a sequence layer, a GOP layer, a picture layer, a slice layer, a macroblock layer, and a block layer.

The sequence layer is a group of picture planes having a series of same attributes, for example, the same picture size and the same video rate. The GOP layer is a group of picture planes serving as a unit of a random access. The picture layer is a group of attributes which are common to one picture plane. The slice layer is a group obtained by finely dividing one picture plane. The macroblock layer is a group obtained by further finely dividing the slice layer and is a group for performing a motion vector detection or the like. The block layer is a block itself for performing a DCT transformation.

A Sequence_Header (SH) is provided at the head of the sequence. In the Sequence_Header, the following items are described.

(1) Horizontal_Size_Value: the number of pixels in the horizontal direction of the video image (2) Vertical_Size_Value: the number of pixels in the vertical direction of the video image (3) Aapect_Ratio_Information: aspect ratio (4) Frame_Rate_Code: display period of the video image (5) VBV_Buffer_Size: capacity of a virtual buffer for controlling a generation code amount (VBV)

(6) Load_Quantization_Matrix: quantization matrix for macroblocks (7) Progressive_Sequence: showing a progressive scan
And the like.

Among them, the information of the number of pixels in the vertical direction of the video image (Vertical_Size_Value) can be predicted from the information of slices.

That is, FIG. 9 shows a construction of slices in one picture. As shown in FIG. 9, one picture is divided into a plurality of slices. The slice at the leftmost edge of the top stage (Bs=1) in one picture is set to Slice (1, 0). The second slice from the left of the top stage is set to Slice (1, 1). In a manner similar to the above, the slice at the leftmost edge of the bottom stage (Bs=N) in one picture is set to Slice (N, 0). The second slice from the left of the bottom stage is set to Slice (N, 1). Although a plurality of slices can exist in the horizontal direction as mentioned above, the slice is certainly switched to the slice which has a new slice ID as a start code at the left edge of the picture. Therefore, a size in the vertical direction of one picture can be predicted by using the slice.

That is, a Slice_Start_Code as a sync code indicative of the start of the slice layer is inserted at the head of each slice. The Slice_Start_Code is shown by "00 00 01 01~AF" of a hexadecimal number. Last one byte ("01~AF" of the fourth byte) of the code indicates the vertical position of the slice by the hexadecimal number. As mentioned above, the 4th byte of the Slice_Start_Code corresponds to the position in the vertical direction of the slice and this means the same number in the same line.

From the above explanation, the number of pixels in the vertical direction of the screen can be predicted by detecting the 4th byte of the Slice_Start Code at the bottom stage in one picture.

FIG. 10 is a functional block diagram showing a construction for predicting the number of pixels in the vertical direction of the screen from the information of the slice as mentioned above. In FIG. 10, the MPEG stream is supplied to an input terminal 41. A Picture_Start_Code in the MPEG stream is detected by a Picture_Start_Code detecting unit 42. A Slice_Start_Code is detected by a Slice_Start_Code detecting unit 43.

The Picture_Start_Code is a code showing the start of the picture layer. The Slice_Start_Code is a code showing the start of the slice layer. The 4th byte of the Slice_Start_Code indicates the vertical position.

An output of the Slice_Start_Code detecting unit 43 is sent to a 4th byte extracting unit 44. In the 4th byte extracting unit 44, the information of the 4th byte of the Slice_Start_Code is extracted. An output of the 4th byte extracting unit 44 is sent to a vertical size register 45.

The head of one picture can be detected by detecting the Picture_Start_Code by the Picture_Start Code detecting unit 42. When the head of one picture is detected, the vertical size register 45 is reset. Whether the Slice_Start_Code has been detected by the Slice_Start_Code detecting unit 43 or not is discriminated.

In the case where the Slice_Start_Code is detected by the Slice_Start_Code detecting unit 43, the information of the 4th byte of the Slice_Start_Code is extracted by the 4th byte extracting unit 44 and the information of the 4th byte of the Slice_Start_Code is supplied to the register 45. Until the next Picture Start_Code is detected by the Picture_Start_Code detecting unit 42, when the Slice_Start_Code is detected by the Slice_Start Code detecting unit 43, the information of the 4th byte of the Slice_Start_Code is extracted by the 4th byte extracting unit 44 and the register 45 is updated on the basis of this value.

When the next Picture_Start_Code is detected by the Picture_Start_Code detecting unit 42, the information in the register 45 is inputted as information of the number of pixels in the vertical direction into a vertical size register 46.

The Slice_Start_Code is detected from the head to the end of the picture by the Slice_Start_Code detecting unit 43 in this manner, and when the Slice Start_Code is detected, the value of the 4th byte is extracted by the 4th byte extracting unit 44 and inputted to the vertical size register 45, so that a predictive value of the number of pixels in the vertical direction is derived from the value in the vertical size register 46.

Figure 11:
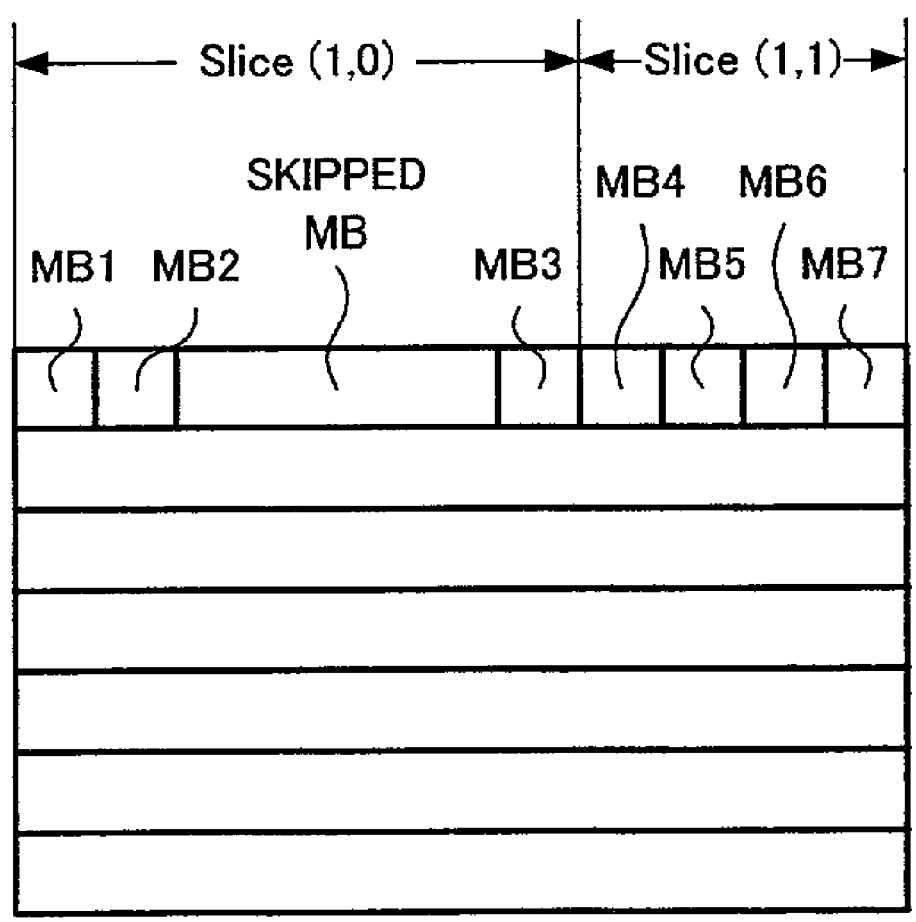
FIG. 11 is a schematic diagram for use in explanation of a macroblock.

The number of pixels in the horizontal direction of the video image (Horizontal_Size_Value) can be predicted from the information of the macroblocks. That is, as shown in FIG. 11, the macroblocks are obtained by further dividing the slice. In this example, there are macroblocks MB1, MB2, and MB3 in a Slice (1, 0) and there are macroblocks MB4, MB5, MB6, and MB7 in a Slice (1, 1). The skipped macroblocks exist between the macroblocks MB2 and MB3 of the Slice (1, 0).

A Macroblock_Address_Increment is provided at the head of the macroblock and it is a VLC (variable length code) indicative of the macroblocks to be skipped. Although the Macroblock_Address_Increment is equal to "1" in the ordinary adjacent macroblocks, when the macroblocks to be skipped exist, it is set to a value increased by the number of skipped macroblocks.

The value of the Macroblock_Address_Increment in one slice, therefore, is accumulated every macroblock, and in the case where a plurality of slices exist in the horizontal direction, by adding the accumulated values of the Macroblock_Address_Increment in each slice, the number of macroblocks in the lateral direction per picture plane can be recognized. By multiplying the recognized number by the size of macroblock, namely, "16" with respect to the luminance signal or "8" with regard to the two color difference signals, the number of pixels in the horizontal direction per picture can be predicted.

Figure 12:
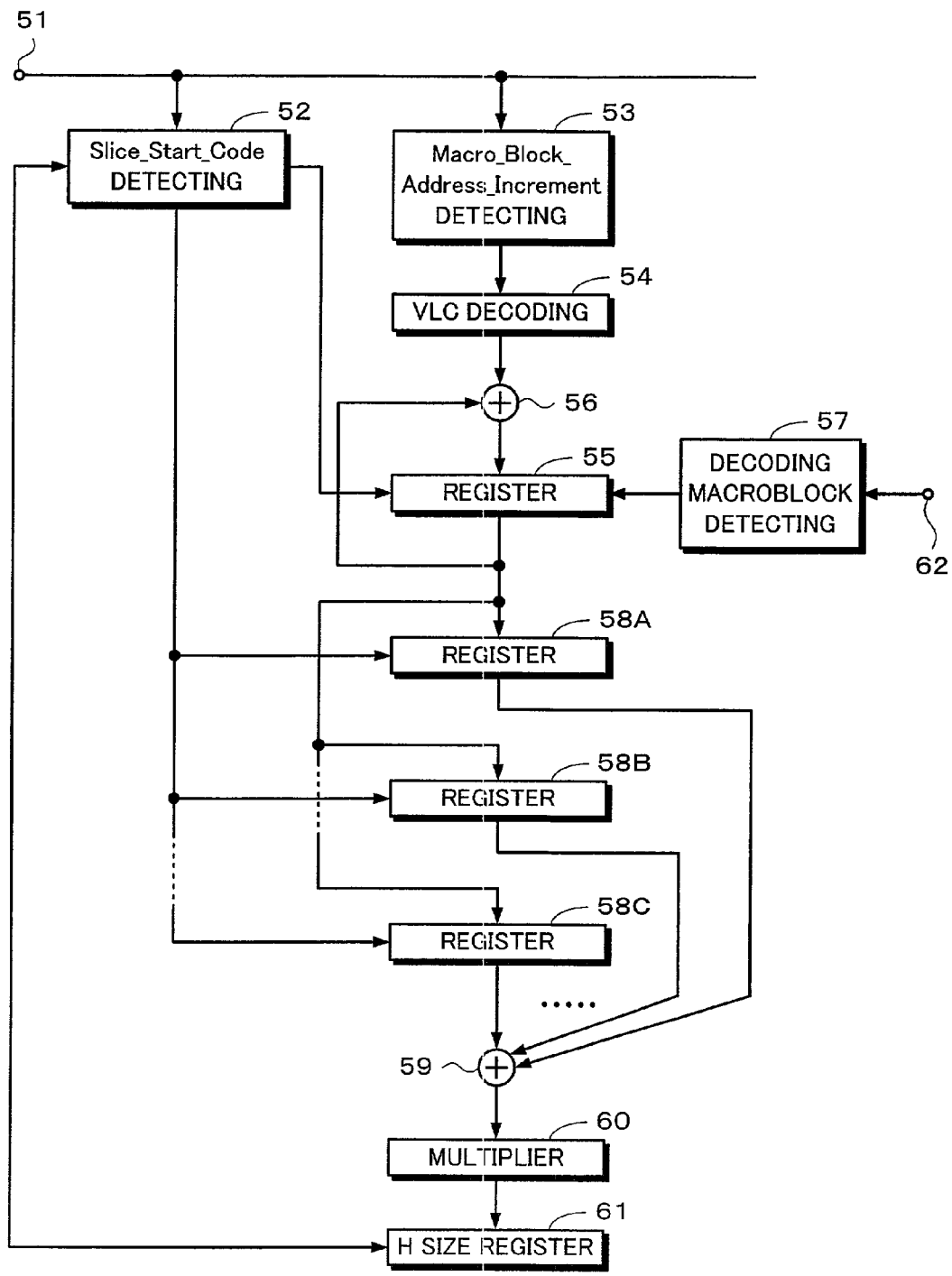
FIG. 12 is a functional block diagram showing a construction of a predicting circuit of a picture size in the vertical direction.

FIG. 12 is a functional block diagram showing a construction for predicting the number of pixels in the horizontal direction of the picture plane from the information of the macroblock as mentioned above.

In FIG. 12, the MPEG stream is supplied to an input terminal 51. The Slice_Start_Code in the MPEG stream is detected by a Slice_Start_Code detecting unit 52 and the Macroblock_Address_Increment is detected by a Macroblock_Address_Increment detecting unit 53.

In case of predicting the number of pixels in the horizontal direction, irrespective of the first Picture Coding Type, the decoding is performed in the MPEG decoder 12 by an intra-process only in such a picture. When the decoding of the macroblock is performed, a signal indicating that the decoding of the macroblock has been performed is outputted. The signal indicating that the decoding of the macroblock has been performed is supplied from an input terminal 62 to a decoding macroblock detecting unit 57.

In the case where the slice at the leftmost edge of one line is detected by the Slice_Code detecting unit 52, register 55, registers 58A, 58B, . . . , and a horizontal size register 61 are cleared. In the Macroblock_Address_Increment detecting unit 53, the Macroblock_Address_Increment is detected.

The Macroblock_Address_Increment indicates skip information of the macroblocks and increment values corresponding to "1" to "33" are written by variable length codes. When the Macroblock_Address Increment is equal to or larger than "33", a Macroblock Escape is also referred to.

An output of the Macroblock_Address_Increment detecting unit 53 is supplied to a VLC decoding unit 54. The value of the Macroblock_Address_Increment is decoded in the VLC decoding unit 54.

An output of the VLC: decoding unit 54 is supplied to an adder 56. An output of the register 55 is supplied to the adder 56. An output of the decoding macroblock detecting unit 57 is supplied to the register 55. When the fact that the decoding of the macroblocks has been performed is detected from the output of the decoding macroblock detecting unit 57, the value of the present Macroblock_Address_Increment and that of the previous Macroblock_Address_Increment are added in the adder 56 and the values of the Macroblock_Address_Increment are accumulated. The accumulated value of the Macroblock_Address_Increment in each slice of the same horizontal line is consequently obtained.

The output of the register 55 is supplied to the registers 58A, 58B, . . . . In the case where there are a plurality of slices in the horizontal direction, the registers 58A, 58B, . . . fetch the accumulated value of the Macroblock_Address_Increment in each slice. An output of the Slice_Start_Code detecting unit 52 is supplied to the registers 58A, 58B, . . . . The accumulated value of the Macroblock_Address_Increment is inputted every slice into the registers 58A, 58B, . . . in response to the output of the Slice_Start_Code detecting unit 52. For example, the accumulated value of the Macroblock_Address_Increment in the first slice of the same horizontal line is inputted to the register 58A. The accumulated value of the Macroblock_Address Increment in the next slice of the same horizontal line is inputted to the register 58B.

Outputs of the registers 58A, 58B, . . . are supplied to an adder 59. In the adder 59, the accumulated value of the Macroblock_Address_Increment in each slice is added. As mentioned above, by adding the value of the Macroblock_Address_Increment accumulated in each slice, the number of macroblocks in the lateral direction per picture plane can be obtained.

An output of the adder 59 is supplied to a multiplier 60. The multiplier 50 multiplies the number of macroblocks by the size of macrblock, thereby calculating the number of pixels in the horizontal direction. That is, in the multiplier 60, by multiplying the number of macroblocks by the size in the horizontal direction of macrblock, the number of pixels in the horizontal direction per picture is calculated. The number of pixels in the horizontal direction obtained in this manner is supplied to the horizontal size register 61.

As mentioned above, in the adder 56 and register 55, the value of the Macroblock_Address Increment in one slice is accumulated every macroblock, and the value of the Macroblock_Address_Increment accumulated in each slice is added by the adder 59, so that the number of macroblocks in the lateral direction per picture plane is calculated. In the multiplier 60, it is multiplied by the size of macroblock, so that the number of pixels in the horizontal direction per picture is obtained.

The aspect ratio (Aapect_Ratio_Information) can be predicted on the basis of the number of pixels in the horizontal direction and the number of pixels in the vertical direction of the video image which were obtained as mentioned above. If the picture size is equal to (720×480), the TV type is the SDTV. Therefore, it is predicted that the aspect ratio is equal to (4:3). If the picture size is equal to (920×1080), the TV type is the HDTV. Therefore, it is predicted that the aspect ratio is equal to (16:9).

A display period (Frame_Rate_Code) of the video image is indirectly predicted by recognizing the decoding timing by the time stamp of the DTS/PTS or the like.

As for the size (VBV_Buffer_Size) of the virtual buffer (VBV) for controlling the generation code amount, the buffer having the maximum size in the possible level profile is prepared. Similarly, also with respect to the decoding video image, the capacity of the ordinary possible maximum size in the relevant level profile is assured.

A quantization matrix for macroblocks (Load Quantization_Matrix) is substituted by a default value.

A Progressive_Sequence is substituted by Progressive_Frame in the Picture_Coding_Type which is multiplexed every frame.

Although the case of decoding the stream of the MPEG1 or MPEG2 system has been described in the above example, the invention can be also similarly applied to the case of decoding a stream of a similar layer structure.

The decoding of the MPEG video stream by the software has been described above. A decoding of an MPEG audio stream by software will now be described hereinbelow. In an MPEG audio decoder, MPEG audio data which is supplied from the outside is decoded by a decoding module, the decoded data is supplied to a codec module, it is digital/ analog converted by the codec module, and the converted analog data is outputted to an external apparatus.

However, when the MPEG audio data decoded by the decoding module is outputted to the codec module, if a channel of the MPEG audio data is switched, the data before the switching of the channels is outputted for a predetermined time, so that it is inconvenient.

Therefore, in the audio decoder by the software in the invention, muting data is outputted from the decoding module to the codec module at the time of channel switching.

Figure 13:
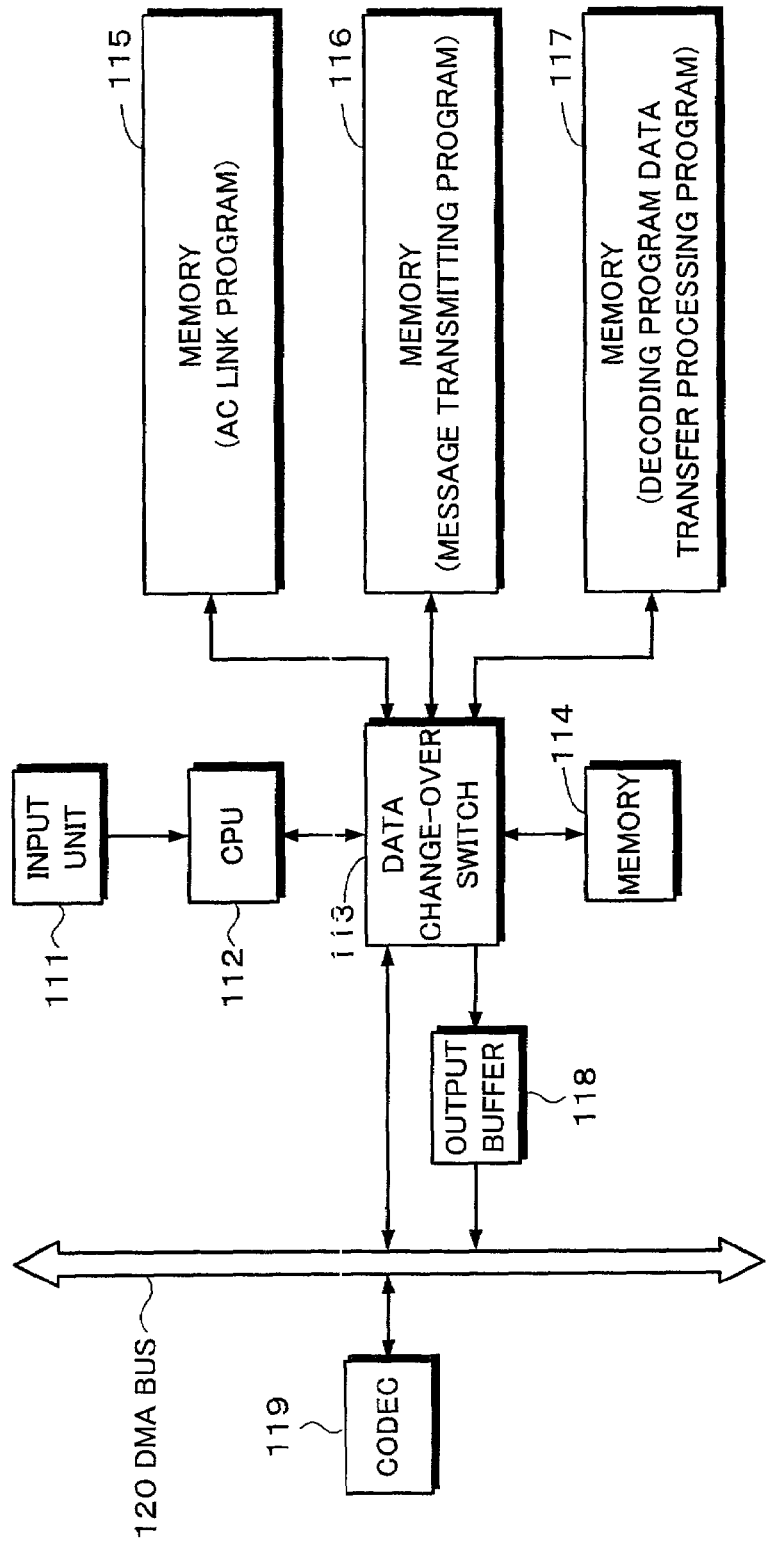
FIG. 13 is a block diagram showing a construction of an embodiment of an audio decoder 100.

FIG. 13 is a block diagram showing a construction of an embodiment of an audio decoder 100.

The user inputs desired information by operating an input unit 111. For example, by operating the input unit 111, the user turns "ON" a power source of the decoder 100, switches the channels of MPEG audio data which is supplied from the outside, or instructs the muting.

A CPU 112 reads out programs stored in memories 115 to 117, which will be explained hereinlater, and executes the programs on the basis of the information supplied from the input unit 111. A data change-over switch 113 switches the MPEG audio data and program data. The MPEG audio data which is supplied from the outside is inputted to a memory 114 through a DMA (Direct Memory Access) bus 120 and the data change-over switch 113 and stored.

An AC link program linked with the power source has been stored in the memory 115. When the user turns "ON" the power source of the decoder 100 through the input unit 111, the CPU 112 reads out the AC link program through the data change-over switch 113 and executes it.

A message transmitting program which corresponds to the information inputted from the input unit 111 and is used for transmitting a message has been stored in the memory 116. This message is transmitted to a decoding program and a data transfer processing program stored in the memory 117, which will be explained hereinlater. That is, when the user inputs desired information through the input unit 111, the CPU 112 reads out the message transmitting program through the data change-over switch 113, executes it, and transmits the message corresponding to the inputted information to the decoding program and the data transfer processing program.

The decoding program for decoding the MPEG audio data stored in the memory 114 at a timing of the supplied message and the data transfer processing program have been stored in the memory 117. The CPU 112 decodes the MPEG audio data stored in the memory 114 at the timing of the message which is supplied and allows the data obtained after completion of the decoding to be stored again in the memory 114. Subsequently, the CPU 112 reads out and executes the data transfer processing program and transfers the MPEG audio data obtained after completion of the decoding and stored in the memory 114 to an output buffer 118. At the time of the power source "ON", the channel switching, and the muting instruction, dummy data (data of "0") which has previously been stored in the memory 114 is transferred to the output buffer 118.

The data temporarily stored in the output buffer 118 is supplied to a codec 119 through the DMA bus 120. The codec 119 digital/analog converts the supplied MPEG audio data obtained after completion of the decoding and outputs the converted data to an external apparatus (not shown through the DMA bus 120.

Figure 14:
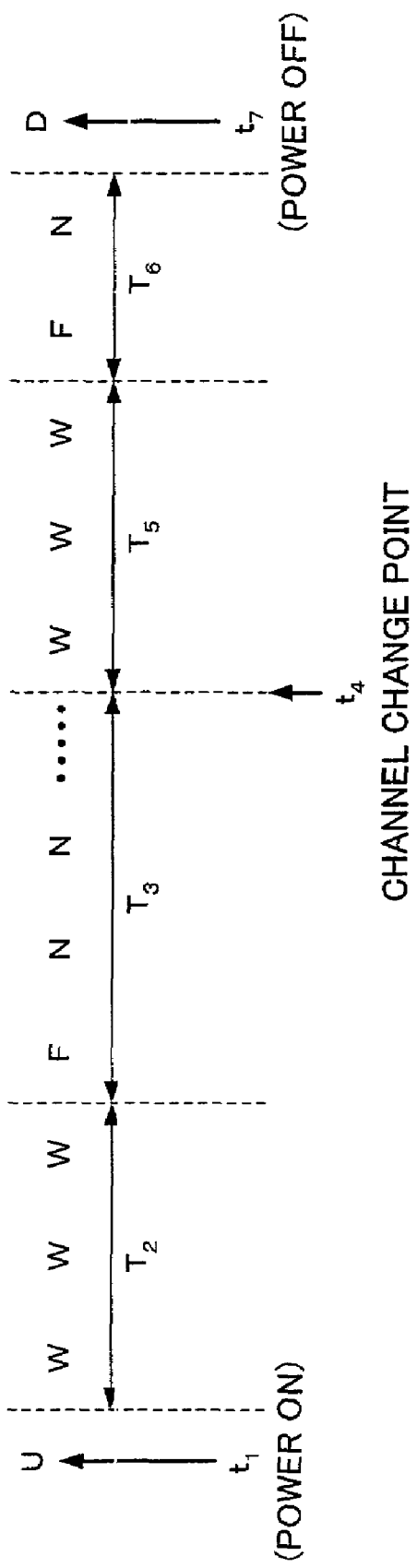
FIG. 14 is a diagram for explaining an example of a message which is transmitted from a message transmitting program to a decoding program.

Subsequently, an example of the message which is transmitted from the message transmitting program in response to the decoding program and the data transfer processing program will now be described with reference to FIG. 14.

First, when the power source is turned "ON" (at time t1) by the user through the input unit 111, a "U" message is transmitted to the decoding program and the data transfer processing program. The "U" message is used for showing that the power source has been turned on. A "W" message is subsequently transmitted to the decoding program and the data transfer processing program for a predetermined time (T2). The "W" message shows "wait for decoding" and T2 denotes the time which is required until the MPEG audio data of a predetermined amount is stored in the memory 14.

When the MPEG audio data of the predetermined amount is stored in the memory 114, an "F" message is transmitted to the decoding program and the data transfer processing program. The "F" message indicates "start the decoding". When this message is received, the CPU 112 starts the decoding of the MPEG audio data stored in the memory 114. After that, an "N" message is transmitted to the decoding program and the data transfer processing program (T3). The "N" message indicates "continue the decoding". The CPU 112 continues the decoding in accordance with this message.

When the user operates the input unit 111 and switches the channel, the "W" message is transmitted to the decoding program and the data transfer processing program for a predetermined time (T5). The CPU 112 waits until the new MPEG audio data is decoded. T5 denotes the time which is required until the MPEG audio data of a predetermined amount obtained after completion of the channel switching is stored in the memory 114.

When the MPEG audio data of the predetermined amount is stored in the memory 114, the "F" message is transmitted to the decoding program and the data transfer processing program. The CPU 112 starts the decoding of the MPEG audio data. After that, the "N" message is transmitted to the decoding program and the data transfer processing program (T6). The CPU 112 continues the decoding.

When the user operates the input unit 111 and turns "OFF" the decoder 100 (time t7), a "D" message is transmitted to the decoding program and the data transfer processing program. The decoding of the MPEG audio data is finished.

Subsequently, a function such that the CPU 112 switches the data which is transferred from the memory 114 to the output buffer 118 on the basis of the message will be described with reference to FIG. 15.

Figure 15A:
FIGS. 15A and 15B are diagrams for explaining a dummy block 131 and a BBB chain 132 in a memory 114.
Figure 15B:
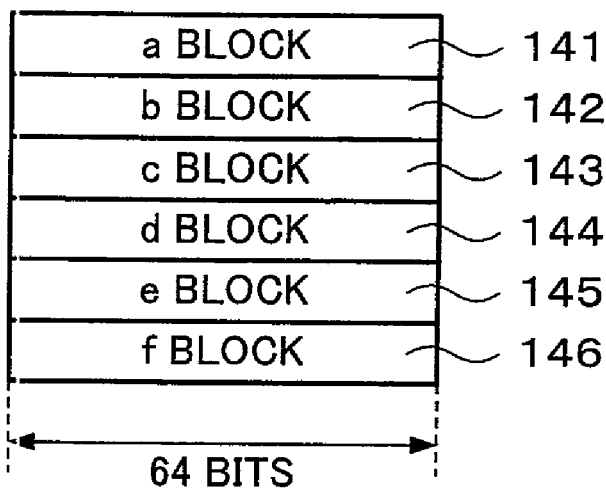

FIG. 15A shows a dummy block 131 which has previously existed in the memory 114. "0" data has been stored in the dummy block 131. FIG. 15B shows a BBB chain 132 in which the MPEG audio data obtained after completion of the decoding is stored. The BBB chain 132 is constructed by six blocks of an (a) block 141 to an (f) block 146 and stores the MPEG audio data obtained after completion of the decoding in order from the (a) block 141.

In the case where the "W" message is transmitted (for example, time T2 and time T5 in FIG.

14) from the message transmitting program in response to the data transfer processing program, the CPU 112 reads out the "0" data from the dummy block 131 in the memory 114 and transfers the read-out "0" data to the output buffer 118. Thus, at the time of turn "ON" of the power source and the channel switching, the muting data is outputted to the codec 119 for a predetermined time.

When the "F" message or "N" message is transmitted (for example, time T3 and time T6 in FIG. 14) from the message transmitting program in response to the data transfer processing program, the CPU 112 reads out the data obtained after completion of the decoding in order from the (a) block 141 of the BBB chain 132 in the memory 114 and transfers the read-out data to the output buffer 118. Thus, the data after the decoding is outputted to the codec 119 while the MPEG audio data is being decoded.

Subsequently, the processing operation in the case where when the power source of the decoder 100 is turned on, the CPU 112 switches the data to be transferred from the memory 114 to the output buffer 118 on the basis of the message will be described with reference to a flowchart of FIG. 16.

First, in step S11, when the user operates the input unit 111 and turns "ON" the power source of the decoder 100, the CPU 112 reads out the AC link program from the memory 115 and executes it.

Subsequently, in step S12, the CPU 112 reads out the message transmitting program from the memory 116 and executes it. At this time, the "U" message indicative of the turn "ON" of the power source is transmitted to the decoding program and the data transfer processing program.

In step S13, the "W" message indicative of the waiting for the start of the decoding is transmitted to the decoding program and the data transfer processing program.

In step S14, the CPU 112 reads out the "0" data from the dummy block 131 in the memory 114 and transfers the data to the output buffer 118.

In step S15, the CPU 112 discriminates whether the MPEG audio data of the predetermined amount has been stored in the memory 114 or not. In step S15, if it is determined that the MPEG audio data of the predetermined amount is not stored in the memory 114, the processing routine is returned to step S13. The subsequent processes are repetitively executed.

In step S15, if it is determined that the MPEG audio data of the predetermined amount has been stored in the memory 114, the processing routine advances to step S16. The "F" message indicative of the start of the decoding is transmitted to the decoding program and the data transfer processing program.

In step S17, the CPU 112 starts the decoding of the MPEG audio data stored in the memory 114 and stores the decoded data into the BBB chain 132 in the memory 114.

In step 518, the CPU 112 reads out the decoded data from the BBB chain 132 in the memory 114 and transfers the data to the output buffer 118.

In step S19, the CPU 112 discriminates whether all of the MPEG audio data has been decoded or not. In step S19, if it is decided that all of the MPEG audio data is not decoded, the processing routine is returned to step S16 and the subsequent processes are repetitively executed. In step S19, if it is decided that all of the MPEG audio data has been decoded, the processing operation is finished.

A medium which is used for installing a program to execute the foregoing series of processes into a computer and setting a state where they can be executed by the computer will now be described with reference to FIG. 17.

Figure 17A:
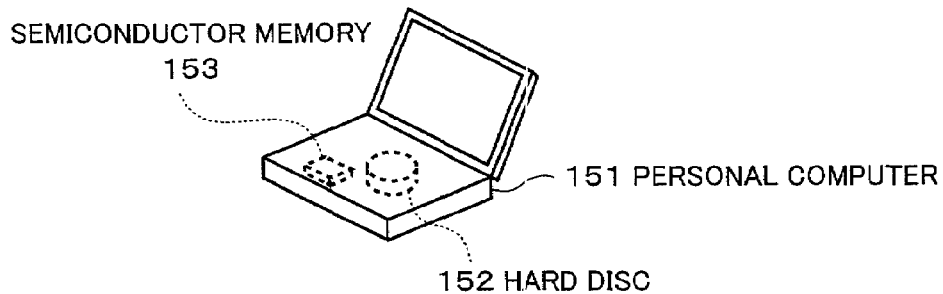
FIGS. 17A to 17C are diagrams for explaining media.

As shown in FIG. 17P, the program can be provided to the user in a state where it has previously been installed in a hard disk 152 or a semiconductor memory 153 as a recording medium built in a personal computer 151 (corresponding to a video decoding apparatus).

Figure 17B:
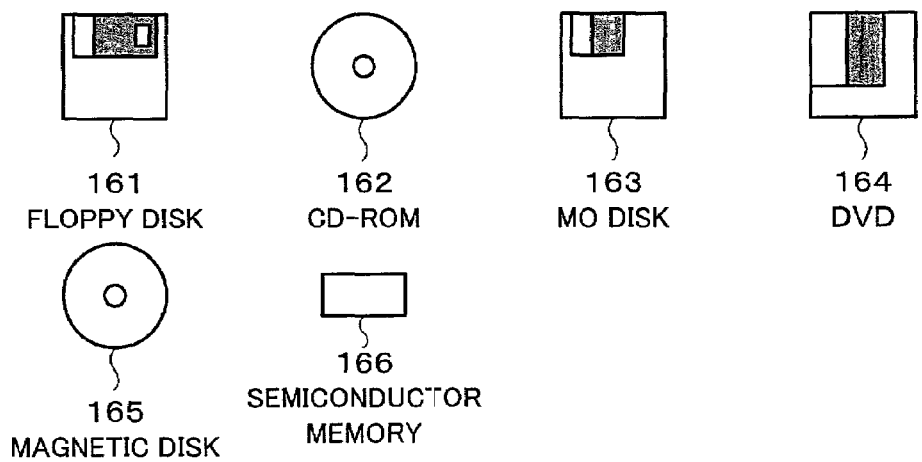

Otherwise, as shown in FIG. 17B, the program can be provided as package software in a state where it is temporarily or permanently stored in a recording medium such as floppy disk 161, CD-ROM 162, MO disk 163, DVD 164, magnetic disk 165, semiconductor memory 166, or the like.

Figure 17C:
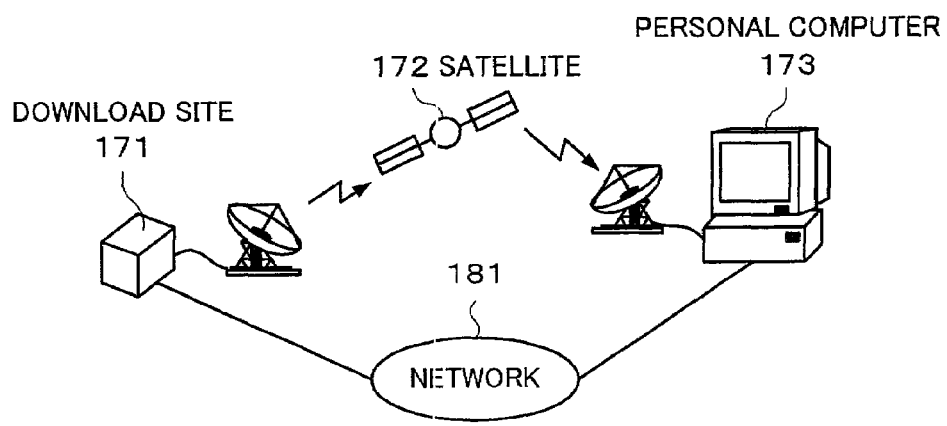

Further, as shown in FIG. 17C, the program can be also provided in a manner such that it is transferred from a download site 171 to a personal computer 173 through a satellite 172 in a wireless manner or transferred to the personal computer 173 through a network 181 such as local area network or Internet in a wired or wireless manner and is downloaded to a built-in hard disk or the like in the personal computer 173.

The "medium" in the specification denotes a broad concept including all of those media.

In the video processing apparatus, video processing method, and medium according to the invention, the addresses are allocated to the inputted video data of the macroblock unit in the ascending order, the video data is stored, and the stored video data is read out in the ascending order of the addresses. Therefore, the number of times of occurrence of the pagemis can be suppressed.

According to the video processing apparatus and method of the invention, when the Sequence_Header is not detected, the 4th byte of the Slice_Start_code is detected, the number of pixels in the vertical direction of the picture plane is predicted, the value of the Macroblock_Address_Increment is accumulated, the number of macroblocks in the horizontal direction of the picture plane is obtained, it is multiplied by the size of macroblock, and the number of pixels in the horizontal direction of the picture plane is predicted. The decoding of MPEG is performed by using the information predicted as mentioned above. Thus, the MPEG stream can be immediately decoded even if the Sequence_Header is not detected.

INDUSTRIAL APPLICABILITY

The invention is suitable for use in decoding of the video signal compressed by MPEG.

The invention claimed is:

1. A video processing apparatus comprising:
input means for inputting video data of a macroblock unit, in which one macroblock of video data includes a Y macroblock, a Cb macroblock, and a Cr macroblock;
storage means, having two or more storage banks, for allocating addresses to said video data inputted by said input means in an ascending order such that each said Y macroblock is allocated a first number of ascending order addresses and each said Cb macroblock and Cr macroblock is allocated a second number of ascending order addresses in which the second number is different than the first number, for switching from one of said banks to another of said banks every horizontal line or width of a video display screen, and for storing said video data therein; and
reading means for reading out said video data stored in said storage means in the ascending order of the addresses,
wherein the first number of ascending order addresses of a respective Y macroblock are arranged in a line or row and the second number of ascending order addresses of each of a respective Cb macroblock and Cr macroblock are arranged in a line or a row such that when one macroblock of video data is read out from said storage means by the reading means a switch between lines or rows does not occur for both (i) the respective Y macroblock and (ii) the respective Cb and Cr macroblocks.

2. A video processing apparatus according to claim 1, further comprising:

conversion storage means for converting said video data read out by said reading means into the data of an address arrangement similar to that of a video image which is displayed on the basis of said video data and storing said video data.

3. A video processing method comprising:

an inputting step of inputting video data of a macroblock unit, in which one macroblock of video data includes a Y macroblock, a Cb macroblock, and a Cr macroblock;

a storing step of allocating addresses to said video data inputted by said inputting step in an ascending order such that each said Y macroblock is allocated a first number of ascending order addresses and each said Cb macroblock and Cr macroblock is allocated a second number of ascending order addresses in which the second number is different than the first number, of switching from one storage bank to another storage bank every horizontal line or width of a video display screen, and of storing said video data therein; and a reading step of reading out said video data stored in said storing step in an ascending order of the addresses, wherein the first number of ascending order addresses of a respective Y macroblock are arranged in a line or row and the second number of ascending order addresses of each of a respective Cb macroblock and Cr macroblock are arranged in a line or a row such that when one macroblock of video data is read out during the reading step a switch between lines or rows does not occur for both (i) the respective Y macroblock and (ii) the respective Cb and Cr macroblocks.

4. A medium for allowing a computer to execute a program, wherein said program comprises:

an inputting step of inputting video data of a macroblock unit, in which one macroblock of video data includes a Y macroblock, a Cb macroblock, and a Cr macroblock;

a storing step of allocating addresses to said video data inputted by said inputting step in an ascending order such that each said Y macroblock is allocated a first number of ascending order addresses and each said Cb macroblock and Cr macroblock is allocated a second number of ascending order addresses in which the second number is different than the first number, of switching from one storage bank to another storage bank every horizontal line or width of a video display screen, and of storing the video data therein; and a reading step of reading out said video data stored by said storing step in the ascending order of the addresses, wherein the first number of ascending order addresses of a respective Y macroblock are arranged in a line or row and the second number of ascending order addresses of each of a respective Cb macroblock and Cr macroblock are arranged in a line or a row such that when one macroblock of video data is read out during the reading step a switch between lines or rows does not occur for both (i) the respective Y macroblock and (ii) the respective Cb and Cr macroblocks.

* * * * *

UNITED STATES PATENT AND TRADEMARK OFFICE
CERTIFICATE OF CORRECTION

PATENT NO. : 7,110,663 B1
APPLICATION NO. : 09/719452
DATED : September 19, 2006
INVENTOR(S) : Ikuo Tsukagoshi It is certified that error appears in the above-identified patent and that said Letters Patent is hereby corrected as shown below:

On the face of the patent, in section (86), the § 371 (c)(1), (2), (4) Date should read --Feb. 26, 2001--.
Column 3, line 64, delete "is".
Column 9, line 9, "performec" should read --performed--.
Column 11, line 65, begin new paragraph beginning with "Although".
Column 13, line 56, delete ":".

Signed and Sealed this

Twenty-sixth Day of December, 2006

JON W. DUDAS
*Director of the United States Patent and Trademark Office*